(12) United States Patent
Cameron

(10) Patent No.: US 12,401,509 B2
(45) Date of Patent: Aug. 26, 2025

(54) ISSUING VERIFIABLE PAIRWISE CLAIMS

(71) Applicant: Microsoft Technology Licensing, LLC, Redmond, WA (US)

(72) Inventor: Kim Cameron, Toronto (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 245 days.

(21) Appl. No.: 17/793,901

(22) PCT Filed: Jan. 28, 2021

(86) PCT No.: PCT/US2021/015498
§ 371 (c)(1),
(2) Date: Jul. 19, 2022

(87) PCT Pub. No.: WO2021/154999
PCT Pub. Date: Aug. 5, 2021

(65) Prior Publication Data
US 2023/0050460 A1 Feb. 16, 2023

(30) Foreign Application Priority Data
Jan. 30, 2020 (LU) .................................. LU101620

(51) Int. Cl.
*H04L 9/30* (2006.01)
*H04L 9/00* (2022.01)
(Continued)

(52) U.S. Cl.
CPC .......... *H04L 9/3073* (2013.01); *H04L 9/0825* (2013.01); *H04L 9/3236* (2013.01); *H04L 9/50* (2022.05)

(58) Field of Classification Search
CPC ....... H04L 9/3073; H04L 9/50; H04L 9/0825; H04L 9/3236
See application file for complete search history.

(56) References Cited

U.S. PATENT DOCUMENTS 10,938,562 B2 * 3/2021 Liu .......................... H04L 63/08
11,050,572 B2 * 6/2021 Steele .................... H04L 9/3239
(Continued)

FOREIGN PATENT DOCUMENTS

| CN | 106254069 A | 12/2016 |
| CN | 110224837 A | 9/2019 |
| WO | 2019179533 A2 | 9/2019 |

OTHER PUBLICATIONS

Aydar, et al., "Towards a Blockchain based digital identity verification, record attestation and record sharing system", In Repository of arXiv:1906.09791v1, Jun. 24, 2019, 25 Pages.
(Continued)

*Primary Examiner* — Harris C Wang
(74) *Attorney, Agent, or Firm* — Workman Nydegger

(57) ABSTRACT

Generating a verifiable pairwise claim. Receiving a request for issuing a verifiable claim that is associated with a subject entity and is verifiable by one or more verifying entities. The request includes at least an encrypted portion using a particular type of encryptography. Verifying that the subject entity is associated with a subject of the verifiable claim based on decrypting the encrypted portion using the particular type of cryptography. In response to verifying that the subject entity is associated with the subject of the verifiable claim, issuing the verifiable claim that is structured to be verifiable only by the one or more verifying entities.

20 Claims, 15 Drawing Sheets

(51) Int. Cl.
*H04L 9/08* (2006.01)
*H04L 9/32* (2006.01)

(56) References Cited

U.S. PATENT DOCUMENTS

| | | | | |
|---|---|---|---|---|
| 11,245,524 | B2* | 2/2022 | Murdoch | H04L 9/3239 |
| 2019/0222424 | A1 | 7/2019 | Lindemann | |
| 2019/0229909 | A1* | 7/2019 | Patel | H04L 9/0637 |
| 2020/0042958 | A1* | 2/2020 | Soundararajan | G06Q 20/401 |
| 2020/0127828 | A1* | 4/2020 | Liu | H04L 9/30 |
| 2020/0127847 | A1* | 4/2020 | Yang | H04L 63/0876 |
| 2020/0145209 | A1* | 5/2020 | Yang | H04L 9/3247 |
| 2020/0211099 | A1* | 7/2020 | Smith | H04L 63/126 |
| 2020/0313897 | A1* | 10/2020 | Heath | H04W 12/47 |
| 2020/0401734 | A1* | 12/2020 | Murdoch | H04L 9/0863 |
| 2020/0403795 | A1* | 12/2020 | Murdoch | G06Q 20/4014 |
| 2021/0126785 | A1* | 4/2021 | Liu | H04L 9/0637 |
| 2021/0314293 | A1* | 10/2021 | Soundararajan | H04L 63/10 |
| 2022/0385475 | A1* | 12/2022 | Murdoch | H04L 63/12 |
| 2023/0050460 | A1* | 2/2023 | Cameron | H04L 9/3247 |
| 2023/0177174 | A1* | 6/2023 | Murdoch | G06F 21/31 726/18 |

OTHER PUBLICATIONS

Barbir, et al., "Updated text of draft Recommendation ITUT X.1252 Baseline identity management terms and definitions", In Telecommunication Standardization Sector of ITU, Jan. 2019, 27 Pages.

"Search Report and Written Opinion Issued in Luxembourg Patent Application No. LU101620", Mailed Date: Sep. 18, 2020, 11 Pages.

Muhle, et al., "A Survey on Essential Components of a Self-Sovereign Identity", In Repository of arXiv:1807.06346v1, Jul. 17, 2018, 7 Pages.

"International Search Report and Written Opinion Issued in PCT Application No. PCT/US21/015498", Mailed Date: Apr. 23, 2021, 13 Pages.

First Examination Report Received for Indian Application No. 202217039801, mailed on Apr. 16, 2025, 06 Pages.

Aydar, et al., "Towards a Blockchain based digital identity verification, record attestation and record sharing system", arXiv:1906.09791v1, Jun. 24, 2019, 26 pages.

First Office Action Received for Chinese Application No. 202180012037.4, mailed on May 20, 2025, 18 pages. (English translation Provided).

* cited by examiner

ISSUING VERIFIABLE PAIRWISE CLAIMS

The present application is a U.S. National Stage of International Application No. PCT/US2021/015498, filed on Jan. 28, 2021, designating the United States and claiming the priority of Luxembourg Patent Application No. LU101620 filed with the Luxembourg Patent Office on Jan. 30, 2020. All of the aforementioned applications are incorporated herein in their respective entireties by this reference.

BACKGROUND OF THE INVENTION

Most of the currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles, and privileges. Centralized identity management systems have been deemed as secure since they often use professionally maintained hardware and software. Typically, the identity issuing organization sets the terms and requirements for registering people with the organization. Finally, when a party needs to verify another party's identity, the verifying party often needs to go through the centralized identity management system to obtain information verifying and/or authenticating the other party's identity.

Decentralized Identifiers (DIDs) are a new type of identifier, which are independent of any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of the distributed ledger cannot be altered retroactively without the alteration of all subsequent sections of the distributed ledger, which provides a fairly secure platform. In such a decentralized environment, each owner of DID generally has control over his/her own data using his/her DID. The DID owner accesses the data stored in the personal storage that is associated with the DID via a DID management module, which is a mobile app, a personal computer, a browser, etc.

The subject matter claimed herein is not limited to embodiments that solve any disadvantages or that operate only in environments such as those described above. Rather, this background is only provided to illustrate one exemplary technology area where some embodiments described herein is practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

As explained in more detail with reference to FIG. 6 and FIG. 7, a claim is a statement about a subject. A pairwise claim is a claim that is accessible only by one or more particular verifiers. As explained with reference to FIG. 7, a verifiable pairwise claim adds additional information to a pairwise claim 702 to enable a verifier to trust the pairwise claim.

Existing technologies allow a user to generate multiple pairwise DIDs, each of which is used by the user to communicate with another party. Pairwise DID mechanism can protect the user's privacy, because each DID is only used to communicate with one other entity. So privacy of the user's identity is preserved in that only one other party obtains the user's identity from the DID. However, when it is the first time that the user is to communicate with a new entity, a new DID needs to be generated. As time goes on, more and more DIDs will be generated, and it is burdensome to manage many DIDs for each user. Further, existing verifiable claims (which are statements about a subject that are encrypted with a user key) are generally allowed to be presented to multiple verifying entities. The greater number of verifying entities are presented a same verifiable claim, the higher risk the user's privacy is exposed at, because it is more likely that the user's key used to encrypt the verifiable claim is to be breached.

The principles described herein aim to solve at least some of the above-mentioned problems by allowing a user to use the same DID to communicate with multiple other parties, but presenting pairwise verifiable claims to each other party. Since each pairwise verifiable claim is only presented to one other party, the privacy of the user is protected. At the same time, the user can repeatedly use the same DID to communicate with multiple other parties, there is no need to generate a new DID for each other party. As such, the burden of managing a large number of DIDs is reduced.

Embodiments disclosed herein are related to issuing a verifiable pairwise claim that is associated with a subject entity and verifiable by one or more predetermined verifying entities. As explained in more detail with reference to FIG. 6 and FIG. 7, a claim is a statement about a subject. A pairwise claim is a claim that is accessible only by one or more particular verifiers. As explained with reference to FIG. 7, a verifiable pairwise claim adds additional information to a pairwise claim 702 to enable a verifier to trust the pairwise claim. The subject entity is associated with a first identifier. The embodiments are implemented in a computing system of a claim issuer (hereinafter also referred to as a "claim issuer"). First, the claim issuer receives a request for issuing a verifiable claim that is associated with a subject entity and is verifiable by one or more predetermined verifying entities. The request includes at least an encrypted portion using a particular type of cryptography. The claim issuer then verifies that the subject entity is associated with a subject of the verifiable claim based on decrypting the encrypted portion using the particular type of cryptography. In response to the verification that the subject entity is associated with a subject of the verifiable claim, the computing system of the claim issuer is configured to issue the verifiable claim to be verifiable only by the predetermined one or more entities or a defined list of entities.

In some embodiments, a condition for accessing the verifiable claim is imposed. When a requesting entity requests for accessing the verifiable claim, the claim issuer determines whether the condition is met. The claim issuer notifies the subject entity the determination of whether the condition is met. In response to the determination that the condition is met, the claim issuer sends the verifiable claim to the subject entity, and causes the subject entity to pass on the verifiable claim to the requesting entity. Alternatively, the claim issuer sends the verifiable claim to the requesting entity directly.

The condition includes verifying that an identity of the requesting entity is one of the predetermined one or more verifying entities. At least one of the one or more verifying entities is associated with a decentralized identifier (DID). The verification of the identity of the requesting entity includes verifying that the requesting entity is the holder of the DID.

Alternatively, or in addition, the condition includes receiving an amount of digital asset. The digital asset includes verifiable digital asset. The verifiable digital asset is broadly defined as an object that has a value and/or can only be consumed for a limited number of times via a computer network.

Alternatively, or in addition, the condition includes a predetermined number of times that the verifiable claim is allowed to be accessed. The condition also includes an expiration time for allowing the verifiable claim to be accessed.

It is advantageous to allow a condition to be imposed when the verifiable claim is to be verified. Existing decentralized identifiers are used by a user and claim issuer to control the issuance of the claim. However, once the claim is issued, the user and/or the claim issuer are unable to control the access of the claim. Imposing conditions to the access of the verifiable claim described herein allows the owner (or subject) of the verifiable claim and the claim issuer to further control the access of the verifiable claim after the claim has been issued.

Further, in some embodiments, the verifiable claim is encrypted by one or more keys to allow the verifiable claim to be transmitted securely via computer networks. In some embodiments, the one or more keys include a public key of the one or more verifying entities, so that the encrypted verifiable claim can only be decrypted by a private key of the one or more verifying entities. Alternatively, or in addition, the one or more keys include a key of the subject entity, so that the encrypted verifiable claim can only be decrypted with permission of the subject entity. Alternatively, or in addition, the one or more keys include a key of the claim issuer.

In some embodiments, the claim issuer sends the encrypted verifiable claim to the subject entity, and cause the subject entity to pass on the verifiable claim to the verifying entity. Alternatively, the claim issuer sends the encrypted verifiable claim to at least one of the one or more verifying entities directly, and cause the verifying entity to request for a permission from the subject entity prior to accessing the received encrypted verifiable claim.

In some embodiments, when the claim issuer receives a request for accessing the encrypted verifiable claim from a requesting entity, the claim issuer determines whether the condition is met. In response to a determination that the condition is met, the claim issuer causes the requesting entity to receive the one or more keys. At least one of the one or more keys is sent to the subject entity, and cause the subject entity to decrypt the encrypted verifiable claim, and send the decrypted verifiable claim to the requesting entity, or cause the subject entity to pass on the at least one key to the requesting entity. Alternatively, the at least one key is sent to the requesting entity directly.

In some embodiments, a condition is imposed for issuing the verifiable claim. When the request for issuing the verifiable claim is received, the claim issuer determines whether the condition is met. The condition for issuing the verifiable claim includes verifying that the request for issuing the verifiable claim is generated by the subject entity. The subject entity is associated with a decentralized identifier (DID). The verifying that the request for issuing the verifiable claim is generated by the subject entity include verifying that the requesting entity is the holder of the DID.

In response to the verification that the request for issuing the verifiable claim is generated by the subject entity, the claim issuer then generate the requested verifiable claim, and cause the verifiable claim to be stored at an identity hub that is associated with the DID. The identity hub is a storage of attributes including keys and metadata under the control of the holder of the DID. The identity hub then is caused to send the verifiable claim to at least one of the one or more verifying entities.

In some embodiments, the request for issuing the verifiable claim not necessarily be generated by the subject entity. For example, the request for issuing the verifiable claim is generated by a verifying entity. In such a case, the claim issuer can impose a condition requiring that the subject entity gives a permission to issue the requested verifiable claim.

Further, in some embodiments, the condition for issuing the verifiable claim also includes receiving an amount of digital asset. Similar to the condition for accessing the verifiable claim, the amount of digital asset is made via anonymous digital asset, including but are not limited to cryptocurrency controlled via a distributed ledger. The digital asset can be any verifiable digital asset.

Additional features and advantages will be set forth in the description which follows, and in part will be obvious from the description, or is learned by the practice of the teachings herein. Features and advantages of the invention are realized and obtained by means of the instruments and combinations particularly pointed out in the appended claims. Features of the present invention will become more fully apparent from the following description and appended claims, or is learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Figure 1:
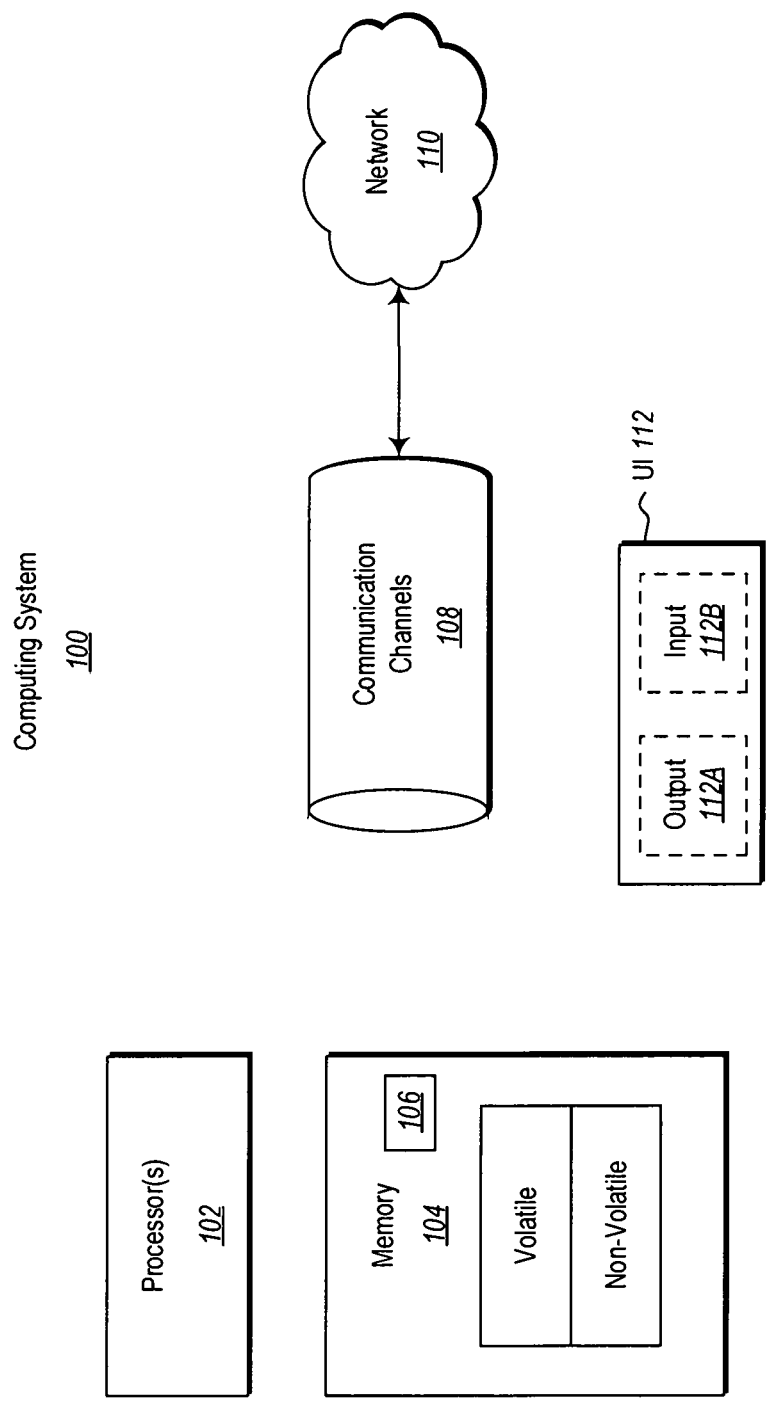
FIG. 1 illustrates an example computing system in which the principles described herein is employed.

Embodiments disclosed herein are related to issuing a verifiable pairwise claim that is associated with a subject entity and verifiable by one or more predetermined verifying entities. The subject entity is associated with a first identifier. The embodiments is implemented in a computing system of a claim issuer (hereinafter also referred to as a "claim issuer"). First, the claim issuer receives a request for issuing a verifiable claim that is associated with a subject entity and is verifiable by one or more predetermined verifying entities. The request includes at least an encrypted portion using a particular type of cryptography. The claim issuer then verifies that the subject entity is associated with a subject of the verifiable claim based on decrypting the encrypted portion using the particular type of cryptography (e.g., private key and public key pairs). A hash or a token may also be used to verify a requesting entity. In response to the verification that the subject entity is associated with a subject of the verifiable claim, the computing system of the claim issuer is configured to issue the verifiable claim to be verifiable only by the predetermined one or more entities or a defined list of entities.

In some embodiments, a condition for accessing the verifiable claim is imposed. When a requesting entity requests for accessing the verifiable claim, the claim issuer determines whether the condition is met. The claim issuer notifies the subject entity the determination of whether the condition is met. In response to the determination that the condition is met, the claim issuer sends the verifiable claim to the subject entity, and cause the subject entity to pass on the verifiable claim to the requesting entity. Alternatively, the claim issuer sends the verifiable claim to the requesting entity directly.

The condition includes verifying that an identity of the requesting entity is one of the predetermined one or more verifying entities. At least one of the one or more verifying entities is associated with a decentralized identifier (DID). The verification of the identity of the requesting entity includes verifying that the requesting entity is the holder of the DID.

Alternatively, or in addition, the condition includes receiving an amount of digital asset. The digital asset includes verifiable digital asset. The verifiable digital asset is broadly defined as an object that has a value and/or can only be consumed for a limited number of times. The digital asset is made by any entities, or be required to be made by one or more particular entities, such as the subject entity and/or the one or more verifying entities.

Alternatively, or in addition, the condition includes a predetermined number of times that the verifiable claim is allowed to be accessed. The condition also include an expiration time for allowing the verifiable claim to be accessed.

Further, the verifiable claim is encrypted by one or more keys. In some embodiments, the one or more keys include a public key of the one or more verifying entities, so that the encrypted verifiable claim can only be decrypted by a private key of the one or more verifying entities. Alternatively, or in addition, the one or more keys include a key of the subject entity, so that the encrypted verifiable claim can only be decrypted with permission of the subject entity. Alternatively, or in addition, the one or more keys include a key of the claim issuer.

The claim issuer sends the encrypted verifiable claim to the subject entity, and cause the subject entity to pass on the verifiable claim to the verifying entity. Alternatively, the claim issuer sends the encrypted verifiable claim to at least one of the one or more verifying entities directly, and cause the verifying entity to request for a permission from the subject entity prior to accessing the received encrypted verifiable claim.

In some embodiments, when the claim issuer receives a request for accessing the encrypted verifiable claim from a requesting entity, the claim issuer determines whether the condition is met. In response to a determination that the condition is met, the claim issuer causes the requesting entity to receive the one or more keys. At least one of the one or more keys is sent to the subject entity, and cause the subject entity to decrypt the encrypted verifiable claim, and send the decrypted verifiable claim to the requesting entity, or cause the subject entity to pass on the at least one key to the requesting entity. Alternatively, the at least one key is sent to the requesting entity directly.

In some embodiments, a condition is imposed for issuing the verifiable claim. When the request for issuing the verifiable claim is received, the claim issuer determines whether the condition is met. The condition for issuing the verifiable claim includes verifying that the request for issuing the verifiable claim is generated by the subject entity. The subject entity is associated with a decentralized identifier (DID). The verifying that the request for issuing the verifiable claim is generated by the subject entity include verifying that the requesting entity is the holder of the DID.

In response to the verification that the request for issuing the verifiable claim is generated by the subject entity, the claim issuer then generate the requested verifiable claim, and cause the verifiable claim to be stored at an identity hub that is associated with the DID. The identity hub is a storage of attributes including keys and metadata under the control of the holder of the DID. The identity hub then is caused to send the verifiable claim to at least one of the one or more verifying entities.

In some embodiments, the request for issuing the verifiable claim not necessarily be generated by the subject entity. For example, the request for issuing the verifiable claim is generated by a verifying entity. In such a case, the claim issuer impose a condition that the subject entity gives a permission to issue the requested verifiable claim.

Further, in some embodiments, the condition for issuing the verifiable claim also includes receiving an amount of digital asset. Similar to the condition for accessing the verifiable claim, the amount of digital asset is made via anonymous digital asset, including but are not limited to cryptocurrency controlled via a distributed ledger. The digital asset also is any verifiable digital asset. The digital asset is made by any entity, or be required to be made by one or more particular entities, such as the subject entity and/or the one or more verifying entities.

Because the principles described herein is performed in the context of a computing system, some introductory discussion of a computing system will be described with respect to FIG. 1. Then, this description will return to the principles of the DID platform with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that are executed by a processor. The memory takes any form and depends on the nature and form of the computing system. A computing system is distributed over a network environment and includes multiple constituent computing systems.

As illustrated in FIG. 1, in its most basic configuration, a computing system 100 typically includes at least one hardware processing unit 102 and memory 104. The processing unit 102 includes a general-purpose processor and also includes a field-programmable gate array (FPGA), an application-specific integrated circuit (ASIC), or any other specialized circuit. The memory 104 is physical system memory, which is volatile, non-volatile, or some combination of the two. The term "memory" also be used herein to refer to non-volatile mass storage such as physical storage media. If the computing system is distributed, the processing, memory and/or storage capability is distributed as well.

The computing system 100 also has thereon multiple structures often referred to as an "executable component". For instance, memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component include software objects, routines, methods, and so forth, that is executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure is computer-readable directly by the processors (as is the case if the executable component were binary). Alternatively, the structure is structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions are embodied on one or more computer-readable media that form a computer program product. An example of such an operation involves the manipulation of data. If such acts are implemented exclusively or near-exclusively in hardware, such as within an FPGA or an ASIC, the computer-executable instructions are hardcoded or hard-wired logic gates. The computer-executable instructions (and the manipulated data) is stored in the memory 104 of the computing system 100. Computing system 100 also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 includes output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse or other pointer input, sensors of any type, and so forth.

Embodiments described herein comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices.

When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions configure the computing system to perform a certain function or group of functions. The computer executable instructions are, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention is practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. In some cases, the invention also is practiced in distributed system environments where local and remote computing systems, which are linked (either by hardwired data links, wireless data links, or by a combination of hardwired and wireless data links) through a network, both perform tasks. In a distributed system environment, program modules are located in both local and remote memory storage devices.

Those skilled in the art will also appreciate that the invention is practiced in a cloud computing environment. Cloud computing environments are distributed, although this is not required. When distributed, cloud computing environments are distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures discuss various computing system which corresponds to the computing system 100 previously described. The computing systems of the remaining figures include various components or functional blocks that implement the various embodiments disclosed herein as will be explained. The various components or functional blocks are implemented on a local computing system or are implemented on a distributed computing system that includes elements resident in the cloud or that implement aspects of cloud computing. The various components or functional blocks are implemented as software, hardware, or a combination of software and hardware. The computing systems of the remaining figures include more or less than the components illustrated in the figures and some of the components are combined as circumstances warrant. Although not necessarily illustrated, the various components of the computing systems access and/or utilize a processor and memory, such as processor 102 and memory 104, as needed to perform their various functions.

Figure 2:
FIG. 2 illustrates an example environment for creating a decentralized identification or identifier (DID)

Some introductory discussions of a decentralized identification (DID) and the environment in which they are created and reside will not be given with respect to FIG. 2. As illustrated in FIG. 2, a DID owner 201 owns or controls a DID 205 that represents an identity of the DID owner 201. The DID owner 201 registers a DID using a creation and registration service, which will be explained in more detail below.

The DID owner 201 is any entity that could benefit from a DID. For example, the DID owner 201 is a human being or an organization of human beings. Such organizations might include a company, department, government, agency, or any other organization or group of organizations. Each individual human being might have a DID while the organization(s) to which each belongs might likewise have a DID.

The DID owner 201 alternatively be a machine, system, or device, or a collection of machine(s), device(s) and/or system(s). In still other embodiments, the DID owner 201 is a subpart of a machine, system or device. For instance, a device could be a printed circuit board, where the subpart of that circuit board are individual components of the circuit board. In such embodiments, the machine or device has a DID and each subpart also have a DID. A DID owner might also be a software component such as the executable component 106 described above with respect to FIG. 1. An example of a complex executable component 106 might be an artificial intelligence. An artificial intelligence also owns a DID.

Thus, the DID owner 201 is any reasonable entity, human or non-human, that is capable of creating the DID 205 or at least having the DID 205 created for and associated with them. Although the DID owner 201 is shown as having a single DID 205, this need not be the case as there is any number of DIDs associated with the DID owner 201 as circumstances warrant.

As mentioned, the DID owner 201 creates and registers the DID 205. The DID 205 is any identifier that is associated with the DID owner 201. Preferably, that identifier is unique to that DID owner 201, at least within a scope in which the DID is anticipated to be in use. As an example, the identifier is a locally unique identifier, and perhaps more desirably a globally unique identifier for identity systems anticipated to operate globally. In some embodiments, the DID 205 is a Uniform Resource Identifier (URI) (such as a Uniform Resource Locator (URL)) or other pointers that relates the DID owner 201 to mechanism to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs based trust on centralized authorities and that remain under control of the corporate directory services, certificate authorities, domain name registries, or other centralized authority (referred to collectively as "centralized authorities" herein). Accordingly, the DID 205 is any identifier that is under the control of the DID owner 201 and independent of any centralized authority.

In some embodiments, the structure of the DID 205 is as simple as a user name or some other human-understandable term. However, in other embodiments, the DID 205 preferably be a random string of numbers and letters for increased security. In one embodiment, the DID 205 is a string of 128 letters and numbers. Accordingly, the embodiments disclosed herein are not dependent on any specific implementation of the DID 205. In a very simple example, the DID 205 is shown as "123ABC".

As also shown in FIG. 2, the DID owner 201 has control of a private key 206 and public key 207 pair that are associated with the DID 20. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair is generated on a device controlled by the DID owner 201. The private key 206 and public key 207 pairs should not be generated on a server controlled by any centralized authority as this causes the private key 206 and public key 207 pairs to not be fully under the control of the DID owner 201 at all times. Although FIG. 2 and this description have described a private and public key pair, it will also be noted that other types of reasonable cryptographic information and/or mechanism also be used as circumstances warrant.

FIG. 2 also illustrates a DID document 210 that is associated with the DID 205. As will be explained in more detail to follow, the DID document 210 is generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 is implemented according to methods specified by a distributed ledger 220 that will be used to store a representation of the DID 205 as will be explained in more detail to follow. Thus, the DID document 210 has different methods depending on the specific distributed ledger.

The DID document 210 also includes the public key 207 created by the DID owner 201 or some other equivalent cryptographic information. The public key 207 is used by third-party entities that are given permission by the DID owner 201 to access information and data owned by the DID owner 201. The public key 207 also be used by verifying that the DID owner 201, in fact, owns or controls the DID 205.

The DID document 210 also includes authentication information 211. The authentication information 211 specify one or more mechanisms by which the DID owner 201 is able to prove that the DID owner 201 owns the DID 205. In other words, the mechanisms of authentication information 211 show proof of a binding between the DID 205 (and thus it's DID owner 201) and the DID document 210. In one embodiment, the authentication information 211 specifies that the public key 207 be used in a signature operation to prove the ownership of the DID 205. Alternatively or in addition, the authentication information 211 specifies that the public key 207 be used in a biometric operation to prove ownership of the DID 205. Accordingly, the authentication information 211 includes any number of mechanisms by which the DID owner 201 is able to prove that the DID owner 201 owns the DID 205.

The DID document 210 also includes authorization information 212. The authorization information 212 allows the DID owner 201 to authorize third party entities the rights to modify the DID document 210 or some part of the document without giving the third party the right to prove ownership of the DID 205. For example, the authorization information 212 allows the third party to update any designated set of one or more fields in the DID document 210 using any designated update mechanism. Alternatively, the authorization information allows the third party to limit the usages of DID 205 by the DID owner 201 for a specified time period. This is useful when the DID owner 201 is a minor child and the third party is a parent or guardian of the child. The authorization information 212 allows the parent or guardian to limit the use of the DID 201 until such time as the child is no longer a minor.

The authorization information 212 also specifies one or more mechanisms that the third party will need to follow to prove they are authorized to modify the DID document 210. In some embodiments, this mechanism is similar to those discussed previously with respect to the authentication information 211.

The DID document 210 also includes one or more service endpoints 213. A service endpoint includes a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers are used by the DID owner 201 or by third party entities to access the services that operate on behalf of the DID owner 201. Specific examples of service endpoints 213 will be explained in more detail to follow.

The ID document 210 further includes identification information 214. The identification information 214 includes personally identifiable information such as the name, address, occupation, family members, age, hobbies, interests, or the like of DID owner 201. Accordingly, the identification information 214 listed in the DID document 210 represents a different persona of the DID owner 201 for different purposes. For instance, a persona is pseudo-anonymous, e.g., the DID owner 201 include a pen name in the DID document when identifying him or her as a writer posting articles on a blog; a persona is fully anonymous, e.g., the DID owner 201 only want to disclose his or her job title or other background data (e.g., a school teacher, an FBI agent, an adult older than 21 years old, etc.) but not his or her name in the DID document; and a persona is specific to who the DID owner 201 is as an individual, e.g., the DID owner 201 includes information identifying him or her as a volunteer for a particular charity organization, an employee of a particular corporation, an award winner of a particular award, etc.

The DID document 210 also includes credential information 215, which also be referred to herein as an attestation. The credential information 215 is any information that is associated with the DID owner 201's background. For instance, the credential information 215 is (but not limited to) a qualification, an achievement, a government ID, a government right such as a passport or a driver's license, a digital asset provider or bank account, a university degree or other educational history, employment status and history, or any other information about the DID owner 201's background.

The DID document 210 also includes various other information 216. In some embodiments, the other information 216 includes metadata specifying when the DID document 210 was created and/or when it was last modified. In other embodiments, the other information 216 includes cryptographic proofs of the integrity of the DID document 210. In still further embodiments, the other information 216 includes additional information that is either specified by the specific method implementing the DID document or desired by the DID owner 201.

FIG. 2 also illustrates a distributed ledger or blockchain 220. The distributed ledger 220 is any decentralized, distributed network that includes various computing systems that are in communication with each other. For example, the distributed ledger 220 includes a first distributed computing system 230, a second distributed computing system 240, a third distributed computing system 250, and any number of additional distributed computing systems as illustrated by the ellipses 260. The distributed ledger or blockchain 220 operates according to any known standards or methods for distributed ledgers. Examples of conventional distributed ledgers that correspond to the distributed ledger or blockchain 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 is stored on the actually distributed ledger. Alternatively, in other embodiments the DID document 210 is stored in a data storage (not illustrated) that is associated with the distributed ledger or blockchain 220.

As mentioned, a representation of the DID 205 is stored on each distributed computing system of the distributed ledger or blockchain 220. For example, in FIG. 2 this is shown as the DID has 231, DID has 241, and DID has 251, which are ideally identical copies of the same DID. The DID hash 231, DID hash 241, and DID hash 251 then point to the location of the DID document 210. The distributed ledger or blockchain 220 also store numerous other representations of other DIDs as illustrated by references 232, 233, 234, 242, 243, 244, 252, 253, and 254.

In one embodiment, when the DID user 201 creates the DID 205 and the associated DID document 210, the DID has 231, DID has 241, and DID hash 251 are written to the distributed ledger or blockchain 220. The distributed ledger or blockchain 220 thus records that the DID 205 now exists. Since the distributed ledger or blockchain 220 is decentralized, the DID 205 is not under the control of any entity outside of the DID owner 201. The DID hash 231, DID has 241, and DID has 251 includes, in addition to the pointer to the DID document 210, a record or timestamp that specifies when the DID 205 was created. At a later date when modifications are made to the DID document 210, this also is recorded in DID has 231, DID has 241, and DID has 251. The DID has 231, DID has 241, and DID hash 251 further includes a copy of the public key 207 so that the DID 205 is cryptographically bound to the DID document 210.

Figure 3:
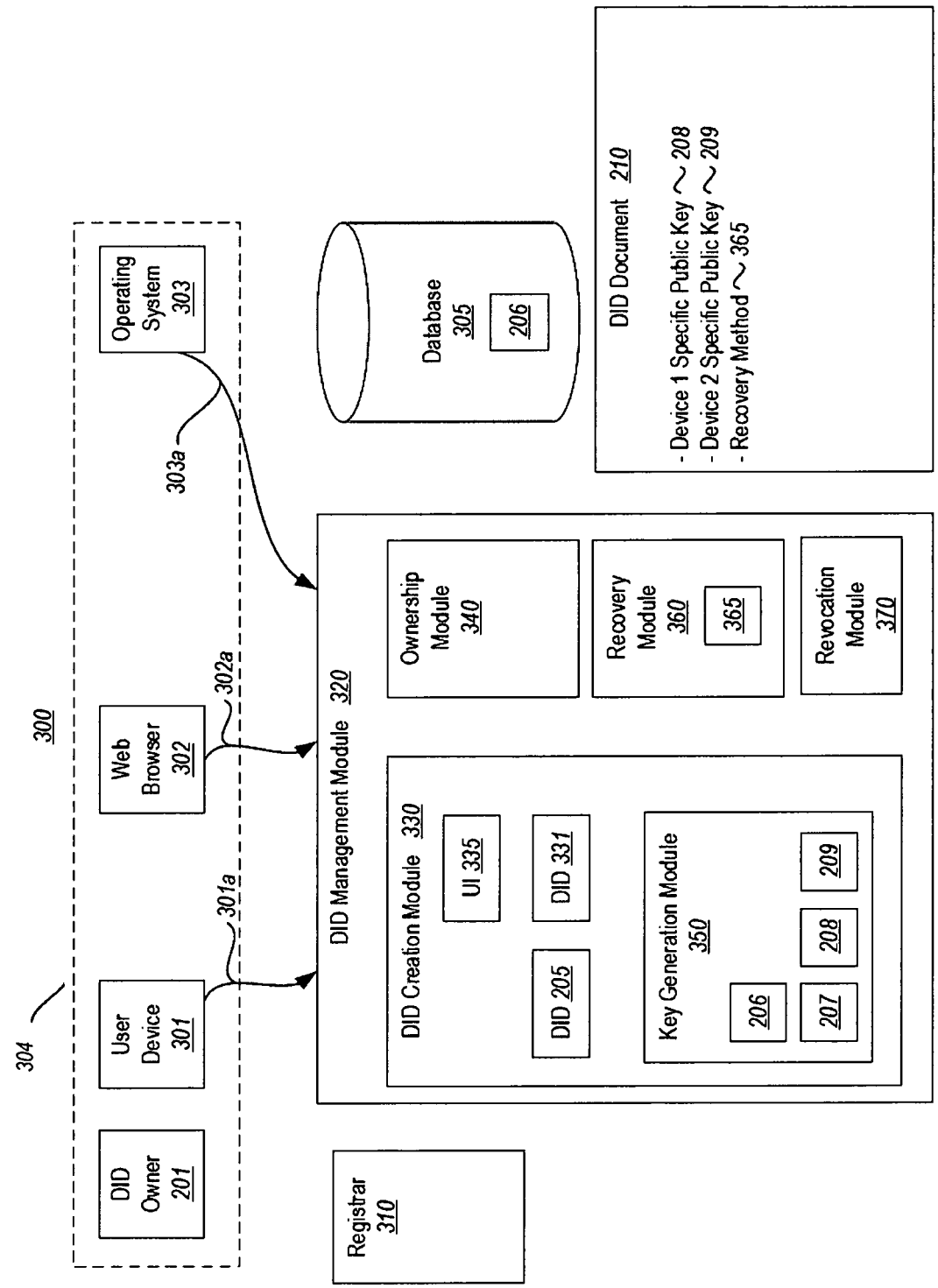
FIG. 3 illustrates an example environment for various DID management operations and services.

Having described DIDs and how they operate generally with reference to FIG. 2, specific embodiments of DIDs will now be explained. Turning to FIG. 3, an environment 300 that is used to perform various DID lifecycle management operations and services will now be explained. It will be appreciated that the environment of FIG. 3 reference elements from FIG. 2 as needed for ease of explanation.

As shown in FIG. 3, the environment 300 includes various devices and computing systems that are owned or otherwise under the control of the DID owner 21. These include a user device 301. In some cases, the user device 301 is a mobile device such as a smartphone, a computing device such as a laptop computer, or any device such as a car or an appliance that includes computing abilities. The device 301 includes a web browser 302 operating on the device and an operating system 303 operating the device. More broadly speaking, the dashed line 304 represents that all of these devices are owned or otherwise under the control of the DID owner 201.

The environment 300 also includes a DID lifecycle management module 320. Sometimes, the DID lifecycle management module 320 also be referred to as a wallet or an agent. It will be noted that in operation, the DID lifecycle management module 320 reside on and be executed by one or more of user device 301, web browser 302, and the operating system 303 as illustrated by the lines 301a, 302a, and 303a. Accordingly, DID lifecycle management module 320 is shown as being separate for ease of explanation.

As shown in FIG. 3, the DID lifecycle management module 320 includes a DID creation module 330. The DID creation module 330 is used by the DID owner 201 to create the DID 205 or any number of additional DIDs, such as DID 331. In one embodiment, the DID creation module includes or otherwise has access to a User Interface (UI) element 335 that guide the DID owner 201 in creating the DID 205. The DID creation module 330 has one or more drivers that are configured to work with the particular distributed ledgers such as distributed ledger 220 so that the DID 205 complies with the underlying methods of that distributed ledger.

A specific embodiment will now be described. For example, UI 335 provides a prompt for the user to enter a user name or some other human recognizable name. This name is used as a display name for the DID 205 that will be generated. As previously described, the DID 205 is a long string of random numbers and letters and so having a human recognizable name for a display name be advantageous. The DID creation module 330 then generates the DID 205. In the embodiments having the UI 335, the DID 205 is shown in a listing of identities and is associated with the human recognizable name.

The DID creation module also includes a key generation module 350. The key generation module generates the private key 206 and public key 207 pairs previously described. The DID creation module 330 then uses the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record the DID hash 231, DID hash 241, and DID hash 251 in the distributed ledger in the manner previously described and to store the DID document 210 in the manner previously described. This process uses the public key 207 in the has generation.

In some embodiments, the DID lifecycle management module 320 includes an ownership module 340. The ownership module 340 provides mechanisms that ensure that the DID owner 201 is aware that the DID owner 201 is in sole control of the DID 205. In this way, the provider of the DID lifecycle management module 320 is able to ensure that the provider does not control the DID 205, but is only providing the management services.

As previously discussed, the key generation module 350 generates the private key 206 and public key 207 pair and the public key 207 is then recorded in the DID document 210. Accordingly, the public key 207 is used by all devices associated with the DID owner 201 and all third parties that desire to provide services to the DID owner 201. Accordingly, when the DID owner 201 desires to associate a new device with the DID 205, the DID owner 201 executes the DID creation module 330 on the new device. The DID creation module 330 then uses the registrar 310 to update the DID document 210 to reflect that the new device is now associated with the DID 205 and this would be reflected in an updated transaction on the distributed ledger 220 as previously described.

In some embodiments, however, it is advantageous to have a public key per device 301 owned by the DID owner 201 as this allows the DID owner 201 to sign with the specific device public key without having to access a general public key. In other words, since the DID owner 201 will use different devices at different times (for example using a mobile phone in one instance and then using a laptop computer in another instance) it is advantageous to have a key associated with each device to provide efficiencies in signing using the keys. Accordingly, in such embodiments, the key generation module generates additional public keys 208 and 209 when the additional devices execute the DID creation module 330. These additional public keys are associated with private key 206 or in some instances is paired with a new private key.

In those embodiments where the additional public keys 208 and 209 are associated with different devices, the additional public keys 208 and 209 are recorded in the DID document 210 as being associated with those devices. This is shown in FIG. 3. It will be appreciated that the DID documents 210 include the information previously described in relation to FIG. 2 in addition to the information shown in FIG. 3. If the DID document 210 existed prior to the device-specific public keys being generated, then the DID document 210 would be updated by the creation module 330 via the registrar 310 and this would be reflected in an updated transaction on the distributed ledger 220.

In some embodiments, the DID owner 201 can keep the association of a device with a public key or even with the DID 205 a secret. Accordingly, the DID creation module 330 causes that such data be secretly shown in the DID document 210.

As described thus far, the DID 205 has been associated with all the devices under the control of the DID owner 201, even when the devices have their own public keys. However, in some embodiments it is useful for each device or some subset of devices under the control of the DID owner 201 to each have their own DID. Thus, in some embodiments the DID creation module 330 generates an additional DID, for example, DID 331, for each device. The creation module would then generate private and public key pairs and DID documents for each of the devices and have them recorded on the distributed ledger 220 in the manner previously described. Such embodiments are advantageous for devices that change ownership as it is possible to associate the specific device DID to the new owner of the device by granting the new owner authorization rights in the DID document and revoking such rights from the old owner.

As mentioned, the private key, to ensure that it is totally in the control of the DID owner 201, is created on the user device 301, browser 302, or operating system 303 owned or controlled by the DID owner 201 that executed the DID management module 320. In this way, there is little chance that a third party gains control of the private key 206, especially the provider of the DID lifecycle management module 320. However, there is a chance that the device storing the private key 206 is lost by the DID owner 201, which causes the DID owner 201 to lose access to the DID 205. Accordingly, in some embodiments, the UI 335 includes the option to allow the DID owner 201 to export the private key 206 to an off device secured database 305 that is under the control of the DID owner 201. In some embodiments, the private key 206 is stored as a QR code that scanned by the DID owner 201.

In other embodiments, the DID lifecycle management module 320 includes a recovery module 360 that is used to recover a lost private key 206. In operation, the recovery module 360 allows the DID owner 201 to select one or more recovery mechanisms 365 at the time the DID 205 is created that later be used to recover the lost private key. In those embodiments having the UI 335, the UI 335 allow the DID owner 201 to provide required information that will be needed by the one or more recovery mechanisms 365 when the recovery mechanisms are implemented. The recovery module then be run on any device associated with the DID 205.

The DID lifecycle management module 320 also includes a revocation module 370 that is used to revoke or sever a device from the DID 205. In operation, the revocation module uses the UI element 335, which allows the DID owner 201 to indicate a desire to remove a device from being associated with the DID 205. In one embodiment, the revocation module access the DID document 210 and causes that all references to the device be removed from the DID document. Alternatively, the public key for the device is removed. This change in the DID document 210 then is reflected as an updated transaction on the distributed ledger 220 as previously described.

Figure 4:
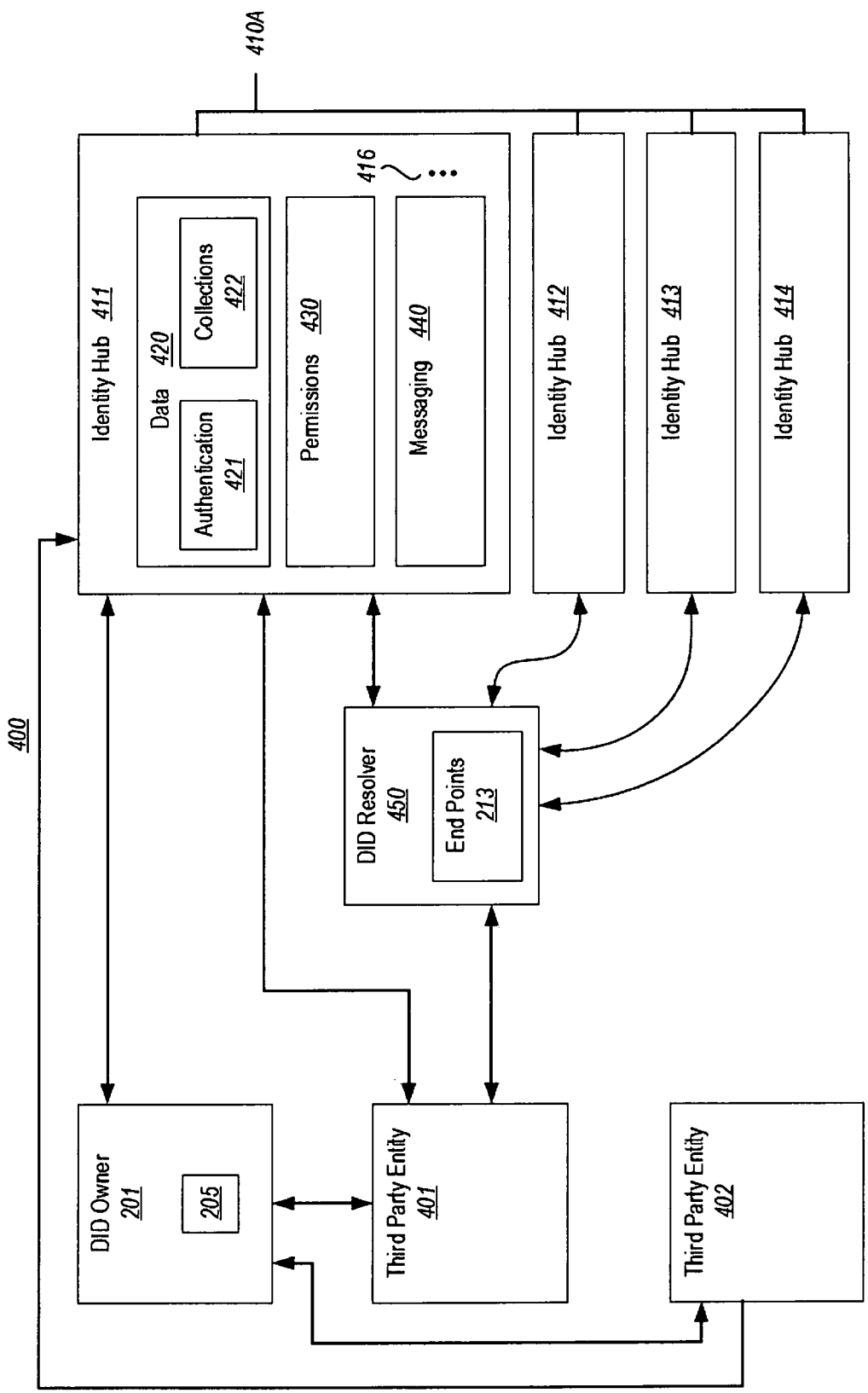
FIG. 4 illustrates an example decentralized personal storage or identity hub.

FIG. 4 illustrates an embodiment of an environment 400 in which a DID such as DID 205 is utilized. Specifically, the environment 400 will be used to describe the use of the DID 205 in relation to one or more decentralized personal storages or identity hubs. An identity hub is a storage of attributes, including keys and metadata under the control of the holder of the DID. It will be noted that FIG. 4 includes references to elements first discussed in relation to FIG. 2 or 3 and thus use the same reference numeral for ease of explanation.

In one embodiment, the identity hubs 410 are multiple instances of the same identity hub. This is represented by line 410A. Thus, the various identity hubs 410 include at least some of the same data and services. Accordingly, if any change is made to one of the identity hubs 410, the change is reflected in the remaining identity hubs. For example, the first identity hub 411 and second identity hub 412 are implemented in cloud storage and thus is able to hold a large amount of data. Accordingly, a full set of the data is stored in these identity hubs. However, the identity hubs 412 and 413 have less memory space. Accordingly, in these identity hubs a descriptor of the data stored in the first and second identity hubs is included. Alternatively, a record of changes made to the data in other identity hubs is included. Thus, changes in one of the identity hubs 410 are either fully replicated in the other identity hubs or at least a record or descriptor of that data is recorded in the other identity hubs.

Because the identity hubs are multiple instances of the same identity hub, only a full description of the first identity hub 411 will be provided as this description also applies to the identity hubs 412-415. As illustrated, identity hub 411 includes data storage 420. The data storage 420 is used to store any type of data that is associated with the DID owner 201. In one embodiment the data is a collection 422 of a specific type of data corresponding to a specific protocol. For example, in some cases, collection 422 is medical records data that corresponds to a specific protocol for medical data. In some other cases, collection 422 is any other type of data.

In one embodiment, the stored data have different authentication and privacy settings 421 associated with the stored data. For example, a first subset of the data has a setting 421 that allows the data to be publically exposed, but that does not include any authentication to the DID owner 201. This type of data is for relatively unimportant data such as color schemes and the like. A second subset of the data has a setting 421 that allows the data to be publically exposed and that includes authentication to the DID owner 201. A third subset of the data has a setting 421 that encrypts the subset of data with the private key 206 and public key 207 pair (or some other key pair) associated with the DID owner 201. This type of data will require a party to have access to the public key 207 or to some other associated public key in order to decrypt the data. This process also includes authentication to the DID owner 201. A fourth subset of the data has a setting 421 that restricts this data to a subset of third parties. This requires that public keys associated with the subset of third parties be used to decrypt the data. For example, the DID owner 201 causes the setting 421 to specify that only public keys associated with friends of the DID owner 201 decrypt this data.

In some embodiments, the identity hub 411 has a permissions module 430 that allows the DID owner 201 to set specific authorization or permissions for third parties such as third parties 401 and 402 to access the identity hub. For example, the DID owner 201 provides access permission to his or her spouse to all the data 420. Alternatively, the DID owner 201 allows access to his or her doctor for any medical records. It will be appreciated that the DID owner 201 permission to any number of third parties to access a subset of the data 420. This will be explained in more detail to follow.

The identity hub 411 also has a messaging module 440. In operation, the messaging module allows the identity hub to receive messages such as requests from parties such as third parties 401 and 402 to access the data and services of the identity hub.

In addition, the messaging module 440 allows the identity hub 411 to respond to the messages from the third parties and to also communicate with a DID resolver 450. This will be explained in more detail to follow. The ellipses 416 represent that the identity hub 411 has additional services as circumstances warrant.

In one embodiment, the DID owner 201 wish to authenticate a new device 301 with the identity hub 411 that is already associated with the DID 205 in the manner previously described. Accordingly, the DID owner 201 utilizes the DID management module 320 associated with the new user device 301 to send a message to the identity hub 411 asserting that the new user device is associated with the DID 205 of the DID owner 201.

However, the identity hub 411 not initially recognize the new device as being owned by the DID owner 201. Accordingly, the identity hub 411 uses the messaging module 440 to contact the DID resolver 450. The message sent to the DID resolver 450 includes the DID 205.

The DID resolver 450 is a service, application, or module that is configured in operation to search the distributed ledger 220 for DID documents associated with DIDs. Accordingly, in the embodiment the DID resolver 450 search the distributed ledger 220 using the DID 205, which result in the DID resolver 450 finding the DID document 210. The DID document 210 then be provided to the identity hub 411.

As discussed previously, the DID document 210 includes a public key 208 or 209 that is associated with the new user device 301. To verify that the new user device is owned by the DID owner 201, the identity hub 411 provides a cryptographic challenge to the new user device 301 using the messaging module 440. This cryptographic challenge will be structured such that only a device having access to the private key 206 will be able to successfully answer the challenge In the embodiment, since the new user device is owned by DID owner 201 and thus has access to the private key 206, the challenge is successfully answered. The identity hub 411 then records in the permissions 430 that the new user device 301 is able to access the data and services of the identity hub 411 and also the rest of the identity hubs 210.

It will be noted that this process of authenticating the new user device 301 was performed without the need for the DID owner 201 to provide any username, password or the like to the provider of the identity hub 411 (i.e., the first cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 provide the DID 205 to the third party entity 401 so that the third party access data or services stored on the identity hub 411. For example, the DID owner 201 is a human who is at a scientific conference who desires to allow the third party 401, who is also a human, access to his or her research data. Accordingly, the DID owner 201 provide the DID 205 to the third party 401.

Once the third party 401 has access to the DID 205, he or she access the DID resolver 450 to access the DID document 210. As previously discussed, the DID document 210 include an endpoint 213 that is an address or pointer to the identity hub 411. The third party 401 then use the address or pointer to access the identity hub 411.

The third party 401 send a message to the messaging module 440 asking for permission to access the research data. The messaging module 440 then send a message to the DID owner 201 asking if the third party 401 should be given access to the research data. Because the DID owner desires to provide access to this data, the DID owner 201 allow permission to the third party 401 and this permission is recorded in the permissions 430.

The messaging module 440 then message the third party 401 informing the third party that he or she is able to access the research data. The identity hub 411 and the third party 401 then directly communicate so that the third party access the data. It will be noted that in many cases, it will actually be an identity hub associated with the third party 401 that communicates with the identity hub 411. However, it a device of the third party 401 that does the communication.

Advantageously, the above-described process allows the identity hub 411 and the third party 401 to communicate and to share the data without the need for the third party to access the identity hub 411 in a conventional manner. Rather, the communication is provisioned in a decentralized manner using the DID 205 and the DID document 210. This advantageously allows the DID owner to be in full control of the process.

As briefly discussed above, the identity hub 411 is hosted in a cloud service. The service provider has access to the data stored in each user's identity hub 411. Furthermore, the service provider also has access to certain activities of the DID owner. For example, the entities with whom the DID owner has shared his/her data is stored in the identity hub 411. As another example, a user has multiple DIDs and has shared data amongst the multiple DIDs, alternatively, the user has used different DID management modules to access the same data. Based on the data sharing activities, the service provider of the identity hub 411 correlate the relationships of different DIDs and find out that two DIDs is related or owned by the same owner. Thus, the user's privacy is compromised.

The principles described herein will solve these potential privacy concerns of DID owners by encrypting the personal data stored in the identity hub 411. The encryption/decryption keys are not stored or accessible by the identity hub 411, so that the DID owners not only have great control over their data from other DID owners or users, but also have their privacy protected from the service providers.

There are many different objects stored in the identity hub 411. A data object is a file, a folder, or any portion of data stored in the identity hub 411. The whole identity hub 411 is encrypted with one encryption/decryption key as one object. Alternatively, a different portion of the data stored in the identity hub 411 is encrypted with different encryption/decryption keys.

In another example embodiment, verifiable claims are issued and stored at the identity hub 411. For example, a verifiable claim that is associated with a DID owner 201 is issued by a claim issuing entity, and the issued verifiable claim is stored at the identity hub 411 that is associated with the DID owner 201. The DID owner 201 send the verifiable claim to another entity when the other entity requires to verify the credential of the DID owner. For example, the DID owner 201 is a person holding a driver's license, and the claim issuing entity is a DMV that has issued the DID owner's driver's license. The DMV issue a verifiable claim that verifies that the DID owner 201 is holding a valid driver's license. The DID owner 201 stores the verifiable claim in the identity hub 411. Another entity is a rental car company, which requires the DID owner 201 to show that he/she has a valid driver's license. The DID owner then sends the verifiable claim stored at the identity hub 411 to the rental car company.

Principles described herein are related to issuing a pairwise verifiable claim that is associated with a subject entity and verifiable by a second entity. Further details of the embodiments of issuing pairwise verifiable claims are described with respect to FIGS. 5 through 15.

Figure 5:
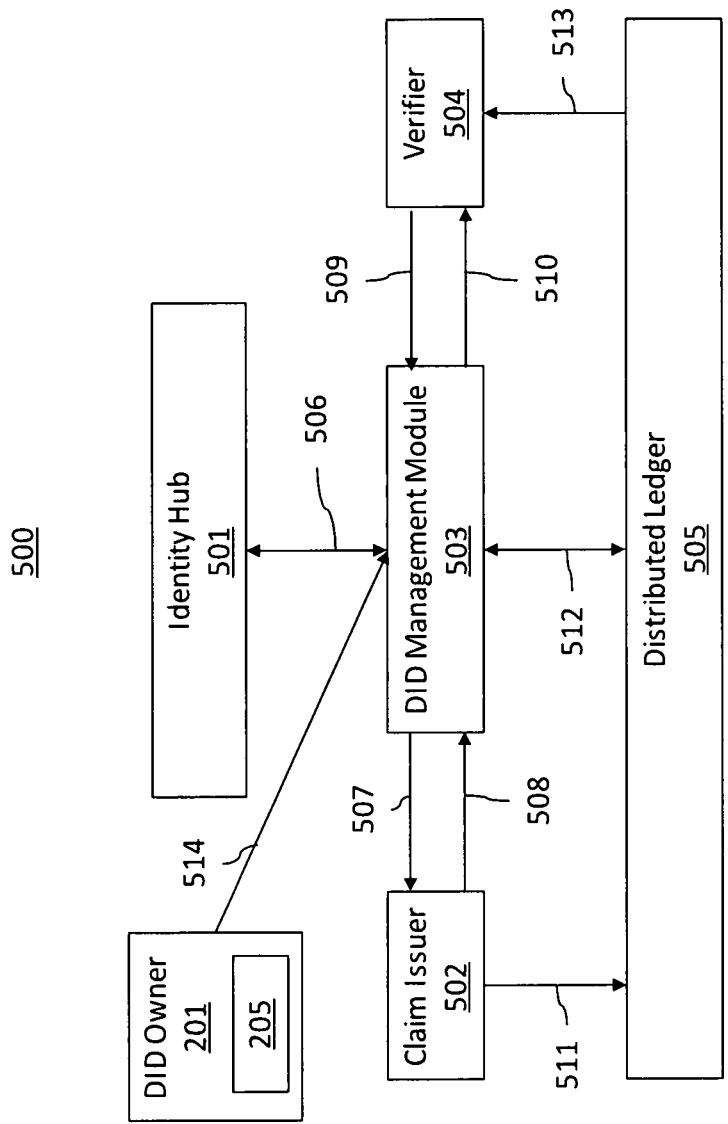
FIG. 5 illustrates an example environment in which the principles described herein is implemented.

FIG. 5 illustrates an environment 500, in which a verifiable claim is issued and accessed. The identity hub 501 corresponds to the identity hub 411 of FIG. 4, the DID management module 503 corresponds to the DID management module 320 of FIG. 3, and the distributed ledger 505 corresponds to the distributed ledger 220 of FIG. 2.

Verifiable claims are also called verifiable credentials, which provide a way to express claims and/or credentials on a computer network that is cryptographically secure, privacy-respecting and automatically verifiable. Claims and/or credentials can be used for various identification, e.g., a driver's license that is used to assert that the subject entity is capable of operating a motor vehicle, a university degree that can be used to assert the subject entity's level of education, a passport that enables the subject entity to travel abroad. In various circumstances, one entity needs to express their training, skill sets, and other qualifications to another entity. For example, when a customer rents a car, the rental car company often requires the customer to show his/her driver's license in person. A verifiable claim will allow such verification to be performed via a computer network.

For example, as illustrated in FIG. 5, the customer is the DID owner 201 that is associated with a DID 205. The DID owner 201 has access to the DID management module 503. In some cases, the DID owner 201 wants to rent a car from a rental car company. Before the rental car company agrees to rent the car to the DID owner, the rental car company require to verify the DID owner's driver's license, which is issued by the DMV. Thus, the DMV is an example claim issuer 502, and the rental car company is an example verifier 504.

As illustrated in FIG. 5, the verifier 504 (e.g., the rental car company) requests the DID management module 503 to show a verifiable claim issued by the claim issuer 502, which is represented by the arrow 509. The DID management module 503 then requests the claim issuer 502 to issue the verifiable claim that the verifier 504 needs, which is represented by arrow 507. The claim issuer 502 will verify the DID 205 of the DID owner. In response to the verification of the DID 205, the claim issuer 502 issues the verifiable claim and sends the issued verifiable claim to the DID management module 503, which is represented by the arrow 508. The claim issuer 502 also records the transaction of issuing the verifiable claim into the distributed ledger 505, which is represented by arrow 511.

Receiving the verifiable claim, the DID management module 503 records the received verifiable claim in the identity hub 501, which is represented by the arrow 506. The DID management module 503 then sends the recorded verifiable claim to the verifier 504, which is represented by arrow 510. The verifier 504 then accesses the distributed ledger 505 to verify the verifiable claim. During the above-described process, the claim issuer 502, the DID management module 503, and the verifier 504 also authenticate or verify the DID 205 of the DID owner 201. Alternatively, or in addition, each of the claim issuer 502 and the verifier 504 also be associated with a DID, and each DID of the claim issuer 502 and the verifier 504 also be authenticated or verified by the DID management module 503.

In particular, the principles described herein related to issuing and accessing a pairwise verifiable claim. Further details related to "pairwise" claims and "verifiable" claims will now be discussed with respect to FIGS. 6 and 7. A "claim" is a statement about a subject. Claims are often expressed using subject-property-value relationships. A pairwise claim is a claim that is accessible only by one or more particular verifiers. As such, even when the property value of the subject is the same, a separate pairwise claim is issued for a different set of verifiers.

Figure 6:
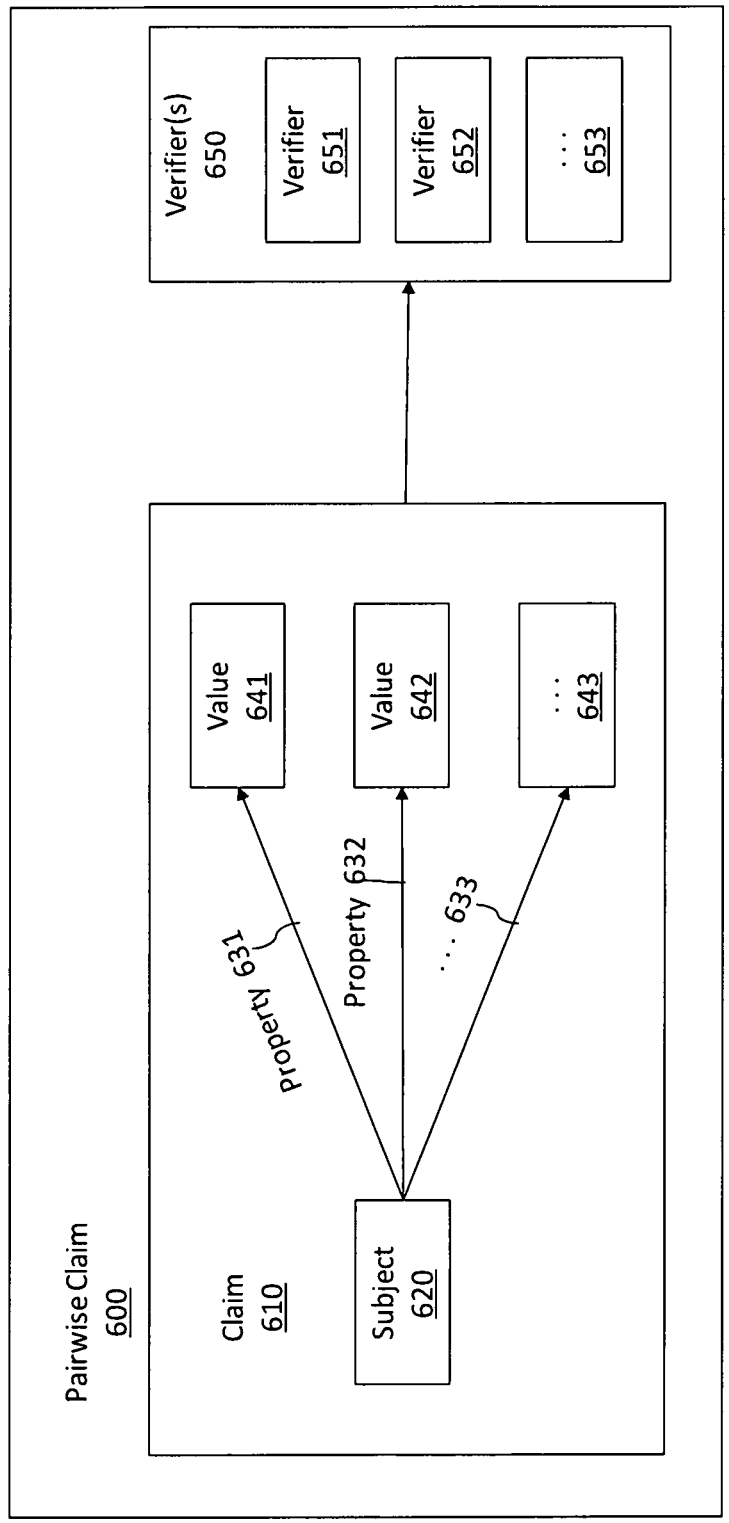
FIG. 6 illustrates an example pairwise claim.

FIG. 6 illustrates an example pairwise claim 600. The pairwise claim 600 includes a claim 610 and one or more predetermined verifiers 650, including verifier 651 and verifier 652. The ellipsis 653 represents that there is any natural number of predetermined verifiers. The claim 610 and the one or more verifiers 650 form a pair, which is called a pairwise claim 600. The claim 610 includes a subject 620. The subject 620 is associated with one or more properties 631, 632. For example, property 631 is associated with a driver's license, and the property 632 is associated with an age greater than 21. Each of the properties has a corresponding value 641, 642. For example, the driver license property 631 has a value of "valid" or "not valid", and the age greater than 21 property 632 have a numeric value as the age of the subject, or a binary value indicating "equal or greater than 21" or "less than 21." The ellipsis 633, 643 represent that there is any number of properties (and respective values) associated with the subject 620.

Figure 7:
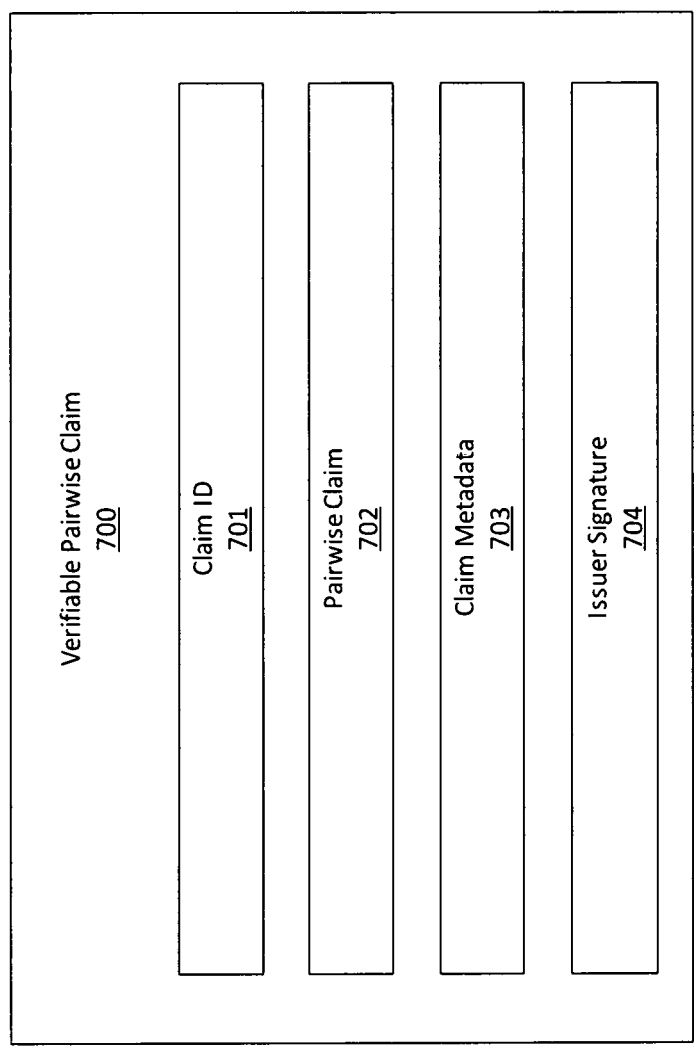
FIG. 7 illustrates an example verifiable pairwise claim.

FIG. 7 illustrates an example of verifiable pairwise claim 700. A verifiable pairwise claim 700 adds additional information to a pairwise claim 702 to enable a verifier to trust the pairwise claim 702. The pairwise claim 702 corresponds to the pairwise claim 600 of FIG. 6. As illustrated in FIG. 7, the verifiable pairwise claim 700 includes a claim ID 701, which uniquely identifies the pairwise claim 702. The claim 700 also includes metadata that describes properties of the pairwise claim 702, e.g., the issuer (e.g., 502), the verifier (e.g., 504), the expiration time, a cost for each access, etc. Further, the verifiable claim 700 includes an issuer signature 704 such that the issuance of the claim can be cryptographically confirmed, and that the claim can be tamper-resistant.

Figure 8:
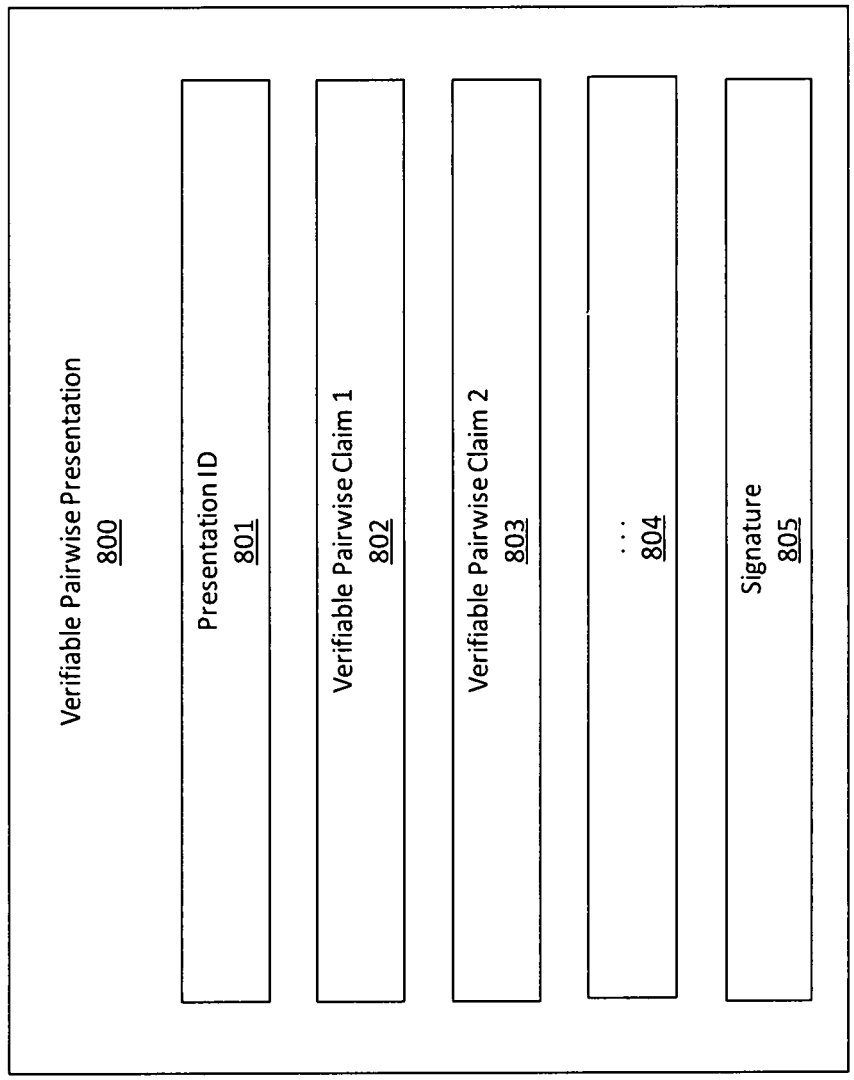
FIG. 8 illustrates an example verifiable pairwise presentation.

When the DID management module 503 presents the verifiable pairwise claim 700 to the verifier 504, the DID management module 503 further organizes a collection of one or more verifiable pairwise claims into a verifiable pairwise presentation. FIG. 8 illustrates an example verifiable pairwise presentation 800. The verifiable pairwise presentation 800 includes one or more verifiable pairwise claims 802, 803, each of which corresponds to the verifiable pairwise claim 700 of FIG. 7. The ellipsis 804 represents that there is any number of verifiable pairwise claims contained in the verifiable pairwise presentation 800. The verifiable pairwise presentation 800 includes a presentation ID 801, which uniquely identifies the pairwise presentation 800. The verifiable pairwise presentation also includes a signature 805 that is signed by the DID management module 503, such that the presentation presented by the DID owner 201 (or the DID 205) can be cryptographically confirmed.

Figure 9A:
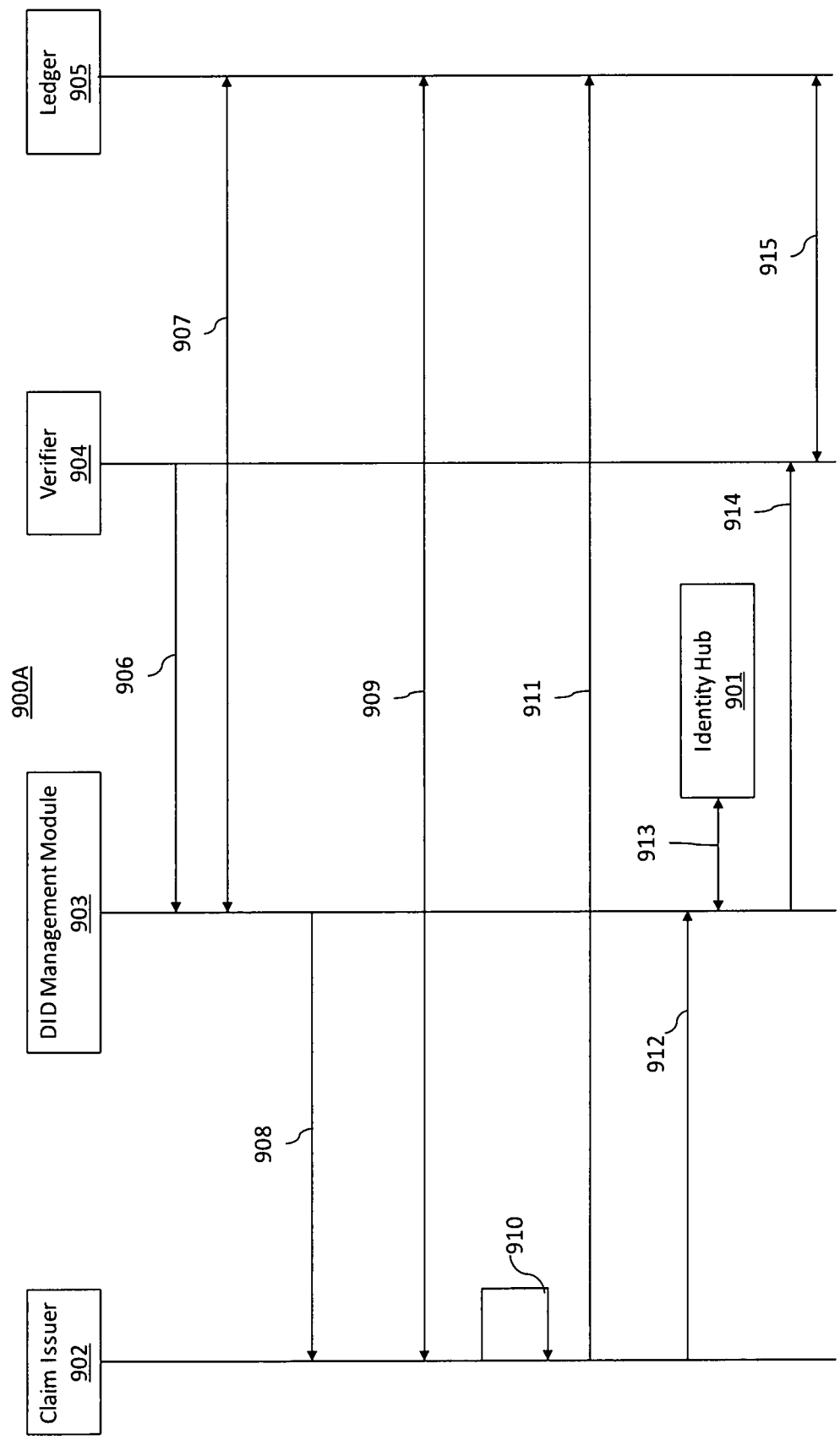
FIGS. 9A-9C illustrate example communication patterns that occur amongst a claim issuer, a DID management module associated with a DID, a verifier, a distributed ledger, and an identity hub.
Figure 9B:
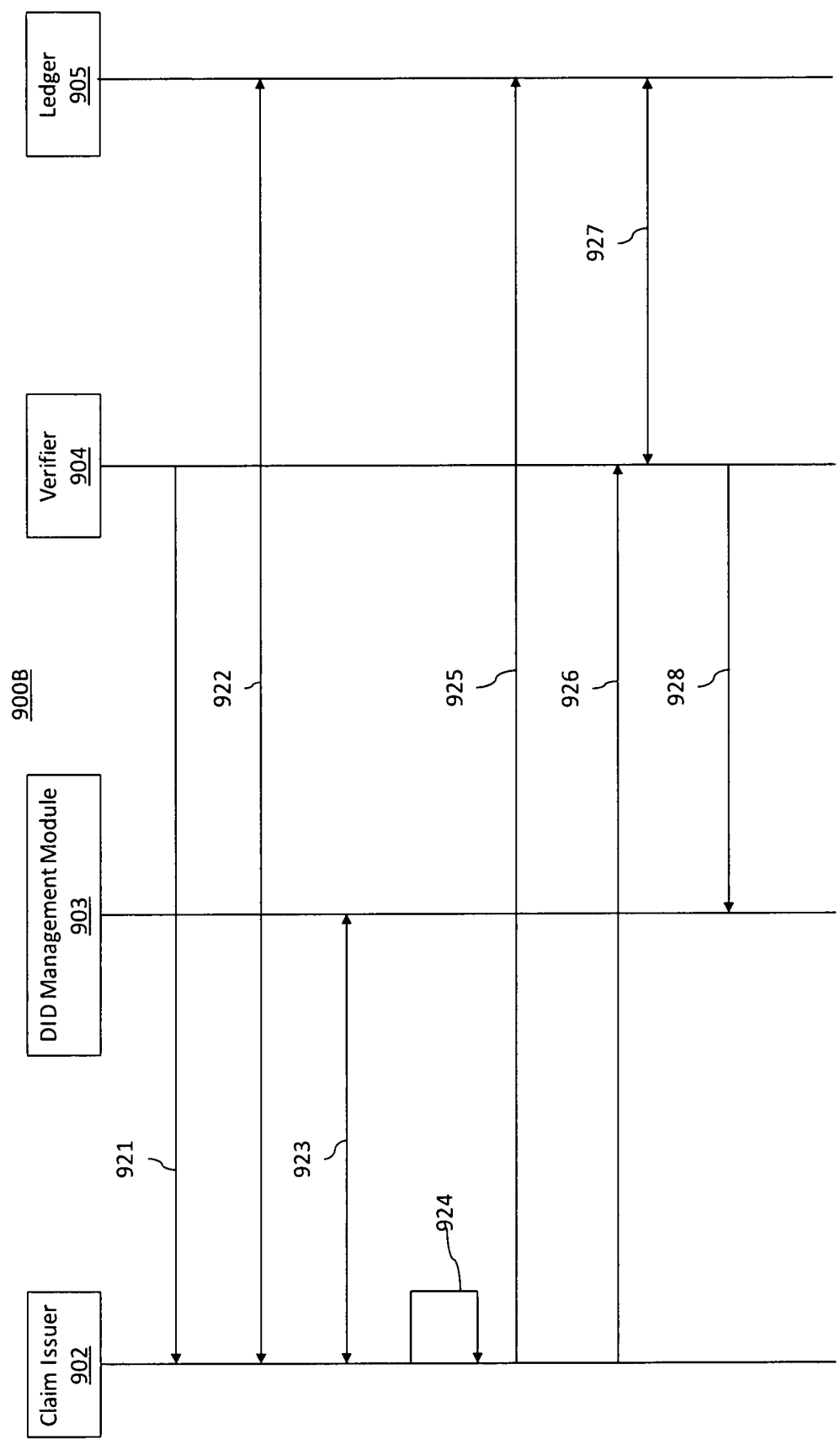
Figure 9C:
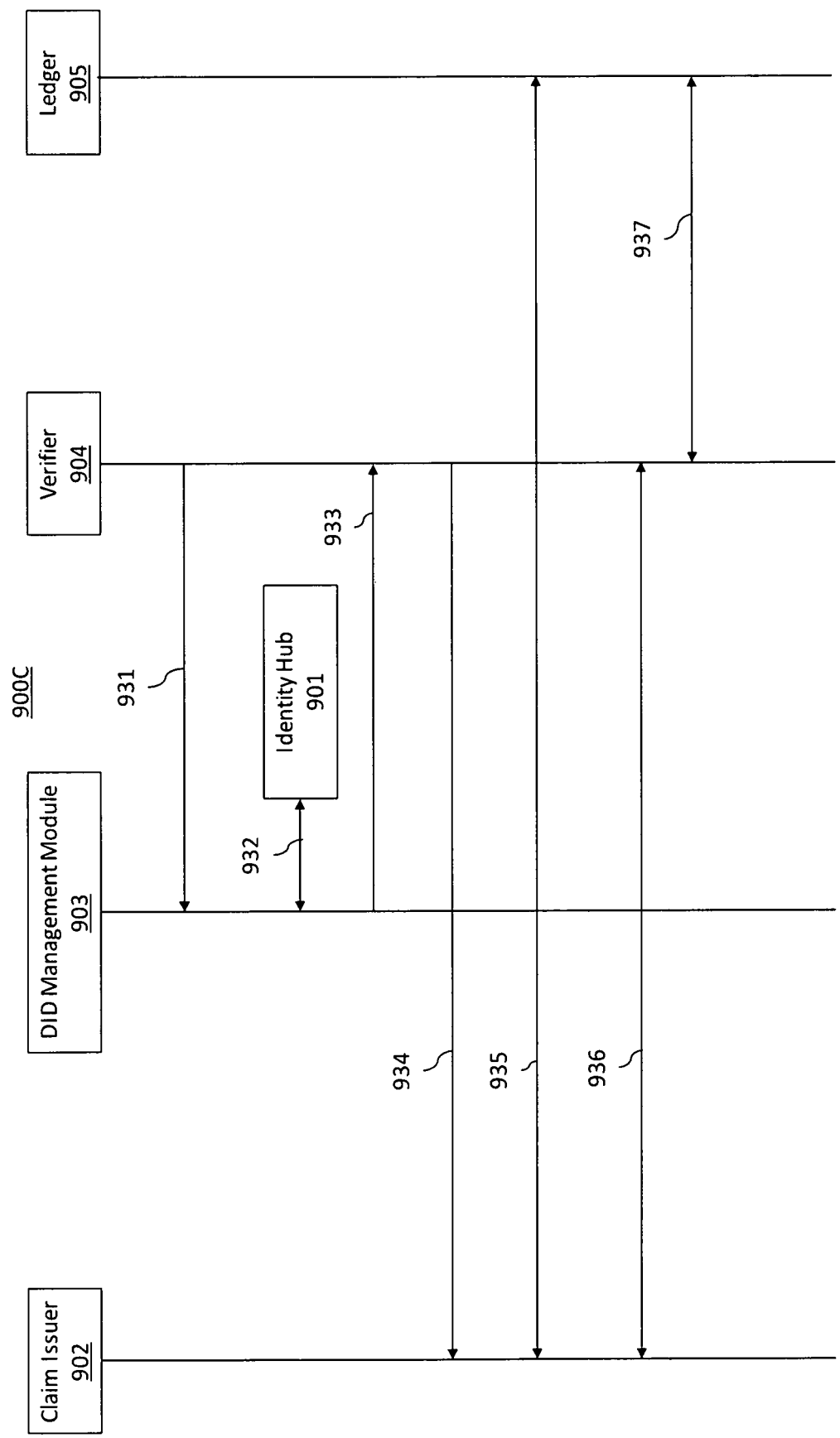

In the process of requesting, issuing and accessing a verifiable pairwise claim, various communications amongst the claim issuer (e.g., 502 of FIG. 5), the DID management module (e.g., 503 of FIG. 5), the verifier 504 (e.g., 504 of FIG. 5), the identity hub (e.g., 501 of FIG. 5), and the distributed ledger (e.g., 505 of FIG. 5) occur. FIGS. 9A-9C illustrate several example communication patterns amongst these entities. Referring to FIGS. 9A-9C, the claim issuer 902 correspond to the claim issuer 502 of FIG. 5, the DID management module 903 corresponds to the DID management module 503 of FIG. 5, the verifier 904 correspond to the verifier 504 of FIG. 5, the distributed ledger 905 corresponds to the distributed ledger 505 of FIG. 5, and the identity hub 901 corresponds to the identity hub 501 of FIG. 5.

Referring to FIG. 9A, the verifier 904 sends a request for a verifiable claim to the DID management module 903, which is represented by arrow 906. In response to receipt of the request, the DID management module 903 verify the identity of the verifier 904 with the distributed ledger 905, which is represented by the arrow 907. After the identity of the verifier 904 is verified with the distributed ledger 905, the DID management module 903 then sends the request for a verifiable pairwise claim to the claim issuer 902, which is represented by the arrow 908. The request includes a first DID 205 that is associated with the DID management module 903 and identity of the verifier 904. For example, the verifier 905 is associated with a second DID, and the second DID also be included in the request.

When the claim issuer 902 receives the request, the claim issuer 902 verify the first DID 205 and/or the identity of the verifier 904 (e.g., the second DID that is associated with the verifier 904) with the distributed ledger 905, which is represented by arrow 909. After the first DID 205 and/or the identity of the verifier 904 are verified, the claim issuer 902 generates a verifiable pairwise claim (e.g., 700 of FIG. 7), which is represented by arrow 910. The claim issuer 902 also records the transaction of the issuance of the verifiable pairwise claim at the ledger 905, which is represented by arrow 911. Next, the claim issuer 902 then sends the generated verifiable pairwise claim to the DID management module 903, which is represented by arrow 912.

The DID management module 903 receives the verifiable pairwise claim from the claim issuer 902 and stores the received verifiable pairwise claim at the identity hub 901, which is represented by arrow 913. The DID management module 903 then generates a verifiable pairwise presentation (e.g., 800 of FIG. 8) and sends the generated verifiable pairwise presentation to the verifier 904, which is represented by the arrow 914. The verifier 904 receives the verifiable pairwise presentation from the DID management module 903 then verify or authenticate the verifiable pairwise presentation with the distributed ledger 905, which is represented by the arrow 915.

FIG. 9B illustrates another example communication pattern amongst the claim issuer 902, the DID management module 903, the verifier 904, and the distributed ledger 905. As illustrated in FIG. 9B, the verifier 904 sends a request for a verifiable claim to the claim issuer 902 directly, which is represented by arrow 921. The request includes the DID 205 that is associated with the subject of the requested verifiable claim and the identity of the verifier 904 (e.g., the DID associate with the verifier 904). After the claim issuer 902 receives the request, the claim issuer 902 verify the DID 205 associated with the subject of the verifiable claim and/or the identity of the verifier with the distributed ledger 905, which is represented by the arrow 922. Further, the claim issuer also notify the DID management module 903 (that is associated with the subject of the verifiable claim) that the verifier 904 has requested the verifiable claim, which is represented by arrow 923. In some embodiments, the claim issuer 902 requires that the DID management module 903 grant permission for the issuer 902 to issue such a verifiable claim before the issuance of the claim.

In response to the verification of the DID 205 and/or the identity of the verifier 904, and receipt of permission from the DID management module 903, the claim issuer 902 generates a verifiable pairwise claim (e.g., 700 of FIG. 7), which is represented by arrow 924. The claim issuer 902 then records the transaction of issuance of the verifiable pairwise claim at the ledger 905, which is represented by arrow 925.

Thereafter, the claim issuer 902 send the verifiable claim directly to the verifier 904, which is represented by arrow 926. After the verifier 904 receives the verifiable claim, the verifier 904 verify and/or authenticate the verifiable claim with the distributed ledger 905, which is represented by arrow 927. In response to the verification and/or authentication of the verifiable claim, the verifier 904 notifies the DID management module 903 of the verification and/or authentication results, which is represented by arrow 928. For example, the verifier 904 is a rental car company, and the claim issuer 902 is a DMV. When the rental car company 904 receives and verifies the claim issued by the DMV 902 that proves that the DID owner 201 holds a valid driver's license, the rental car company 904 send an approval notification to the DID management module 903 and allow the DID owner 201 to complete a car rental transaction with the rental car company 904.

FIG. 9C further illustrates a communication pattern amongst the claim issuer 902, the DID management module 903, the verifier 904, the distributed ledger 905, and the identity hub 901, when the verifiable pairwise claim has been previously issued and stored at the identity hub 901. Referring to FIG. 9C, the verifier 904 first sends a request for a verifiable claim to the DID management module 903, which is represented by arrow 931. Here, the DID management module 903 then accesses the identity hub 901 to see whether the requested verifiable claim has been issued and stored at the identity hub 901 previously. For example, the verifier 904 is a rental car company, and the DID owner 201 has rented a car previously from the rental car company 904. In response to detecting that a previously issued pairwise claim is stored in the identity hub 901, the DID management module 903 retrieves the previously issued verifiable pairwise claim, which is represented by arrow 932. The DID management module 903 also generates a verifiable pairwise presentation and send the verifiable pairwise presentation to the verifier 904, which is represented by arrow 933.

In some embodiments, the issued verifiable pairwise claim is encrypted by a key of the claim issuer 902. When the verifier 904 receives the verifiable pairwise claim from the DID management module 903 and tries to access the verifiable pairwise claim, the verifier 904 and/or the DID management module 903 is caused to send a notification to the claim issuer 902, which is represented by arrow 934. After the claim issuer 902 receives the notification, the claim issuer 902 verify the DID 205 that is associated with the subject of the verifiable pairwise claim and/or the identity of the verifier 904 with the distributed ledger 905, which is represented by the arrow 935. In response to the verification, the claim issuer 902 then sends the decryption key to the verifier 904, which is represented by arrow 936.

In some embodiments, the claim issuer 902 imposes additional conditions before sending the decryption key to the verifier 904. For example, the verifiable pairwise claim includes an expiration date, and the claim issuer 902 verifies whether the previously issued verifiable pairwise claim has been expired. Only if the claim is not expired, the claim issuer 902 sends the decryption key to the verifier 904. When it is determined that the previously issued verifiable pairwise claim has been expired, the claim issuer 902 simply notify the verifier and/or the DID management module 903 that the claim has been expired. Alternatively, or in addition, the claim issuer 902 require the verifier 904 and/or the DID management module 903 to pay a predetermined charge to reissue the claim. Only when the DID management module 903 and/or the verifier 904 pays the predetermined charge to the claim issuer 902, the claim issuer 902 will reissue a new verifiable pairwise claim with a new expiration date. Finally, after the verifier 904 receives the decryption key or a new verifiable pairwise claim, the verifier 904 verify and/or authenticate the claim with the distributed ledger 905, which is represented by arrow 937.

The following discussion now refers to a number of methods and method acts that is performed. Although the method acts is disused in a certain order or illustrated in a flow chart as occurring in a particular order, no particular ordering is required unless specifically stated, or required because an act is dependent on another act being completed prior to the act being performed.

Figure 10A:
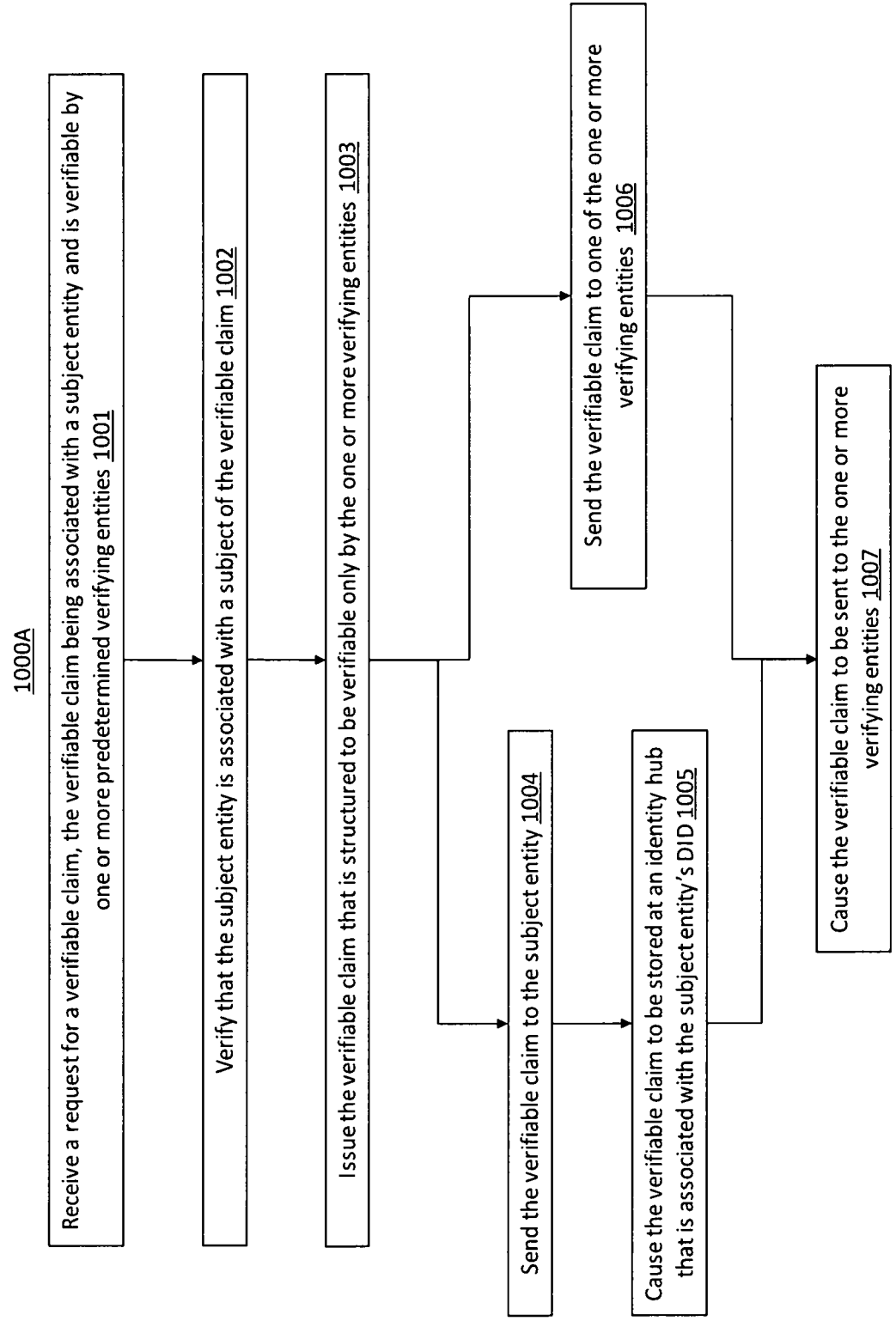
FIG. 10 illustrates a flowchart of an example method for issuing a verifiable pairwise claim.
Figure 10B:
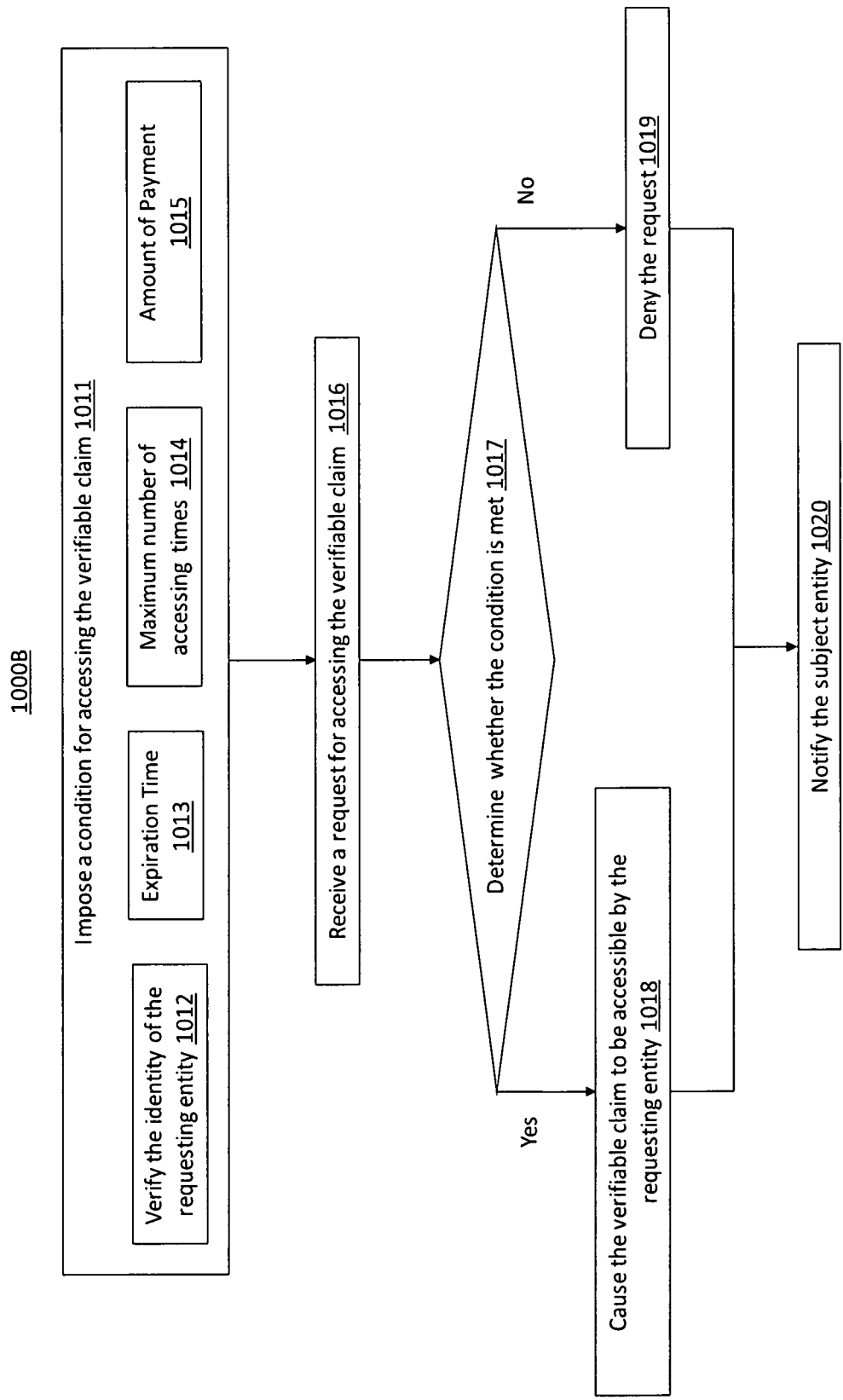

FIG. 10 illustrates a flowchart of an example method 1000 for issuing a verifiable pairwise claim that is associated with a subject entity and is verifiable by one or more verifying entities. The method 1000 is implemented at a computing system of the claim issuer. The subject entity corresponds to the DID owner 201 that is associated with the DID management module 503, and the one or more verifying entities correspond to the verifier 504 of FIG. 5. The verifiable pairwise claim corresponds to the verifiable pairwise claim 700 of FIG. 7.

The method 1000 includes receiving a request for a verifiable claim 1001). The verifiable claim is associated with the subject entity and is verifiable by the one or more verifying entities. The request is sent from the subject entity or the one or more verifying entities. For example, as illustrated in FIG. 9A, the request is sent from the subject entity (e.g., DID management module 903); and as illustrated in FIG. 9B, the request is sent from the one or more verifying entities (i.e., verifier 904).

After receiving the request for the verifiable claim, the computing system then verifies that the subject entity is associated with a subject of the verifiable claim 1002). For example, the subject entity is a customer, who wants to rent a car from a rental car company. The rental car company is an example one or more verifying entities that needs to verify that the customer has a valid driver's license. Since the driver's license is issued by the DMV, the DMV is the claim issuer, which receives the request for the verifiable claim. The DMV verifies that the customer's DID is associated with a driver's license. In response to the verification, the verifiable claim is then issued (1003).

The verifiable claim is sent to the subject entity (1004). The verifiable claim also be caused to be stored at an identity hub that is associated with the subject entity (1005). In some embodiments, the identity of the one or more verifying entities is also verified (1006). The verifiable pairwise claim then is sent to the one or more verifying entities (1007). As illustrated in FIG. 9A, in some embodiments, the verifiable pairwise claim is sent to the one or more verifying entities from the subject entity (i.e., DID management module 903). As illustrated in FIG. 9B, in some embodiments, the verifiable pairwise claim is sent to the one or more verifying entities directly from the claim issuer 902.

Different embodiments are implemented to issue a verifiable claim that is structured to be verifiable only by the one or more verifying entities. In some embodiments, the verifiable claim is encrypted by a public key of the one or more verifying entities, such that the one or more verifying entities can decrypt the encrypted verifiable claim using its private key. For example, when the one or more verifying entities is associated with a second DID, the verifiable claim is encrypted by the public key associated with the second DID.

Figure 11:
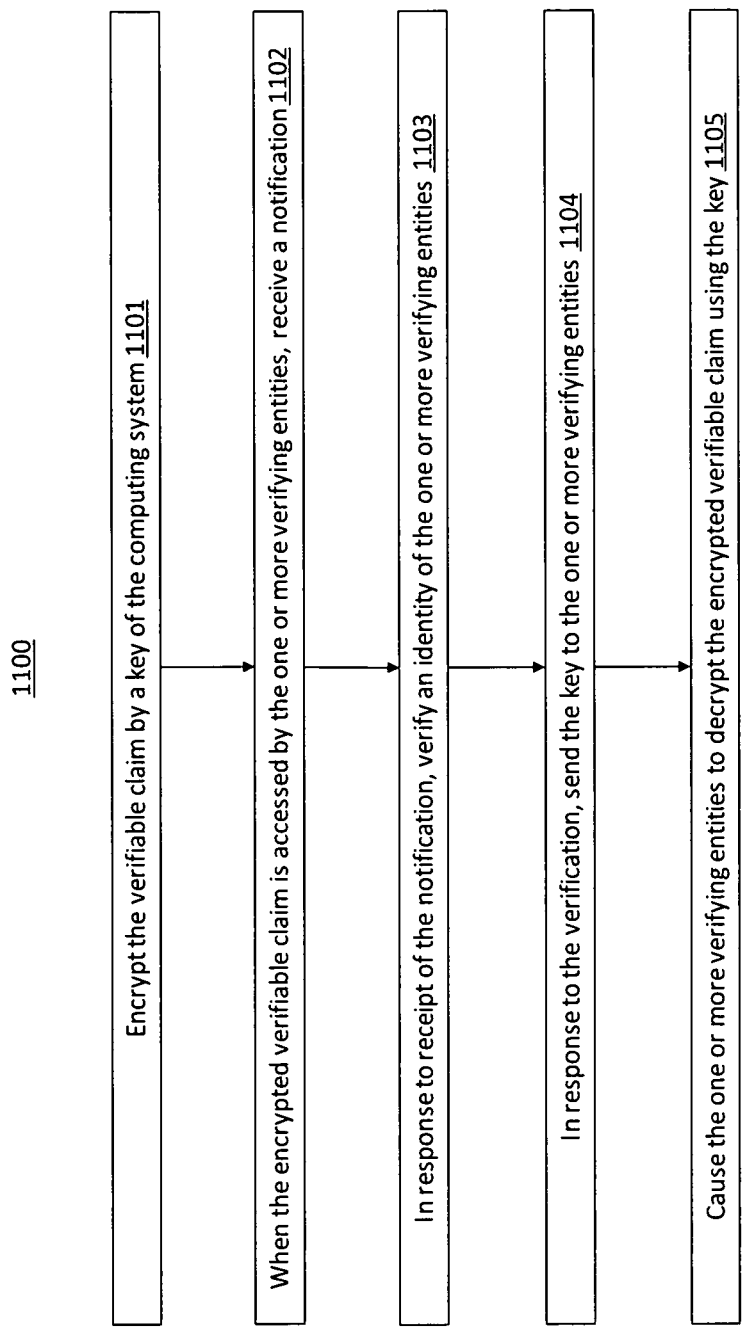
FIG. 11 illustrates a flowchart of an example method for issuing a verifiable claim that is structured to be verifiable only by a second entity.

In some embodiments, the verifiable claim is encrypted by a key of the claim issuer. FIG. 11 illustrates a flowchart of an example method 1100 for issuing a verifiable claim that is structured to be verifiable only by the one or more verifying entities, which correspond to the step 1003 of FIG. 10. As illustrated in FIG. 11, the method 1100 includes encrypting the verifiable claim by a key of the claim issuer (1101). When the encrypted verifiable claim is accessed by the one or more verifying entities, the claim issuer receives a notification (1102). The notification is sent by the first computing system (e.g., the DID management module 903) and/or the second computing system (e.g., the verifier's computing system 904). In response to receipt of the notification, an identity of the one or more verifying entities is verified (1103). In response to the verification, the key is then sent to the one or more verifying entities (1104), and the one or more verifying entities is caused to decrypt the encrypted verifiable claim using the key (1105).

Figure 12:
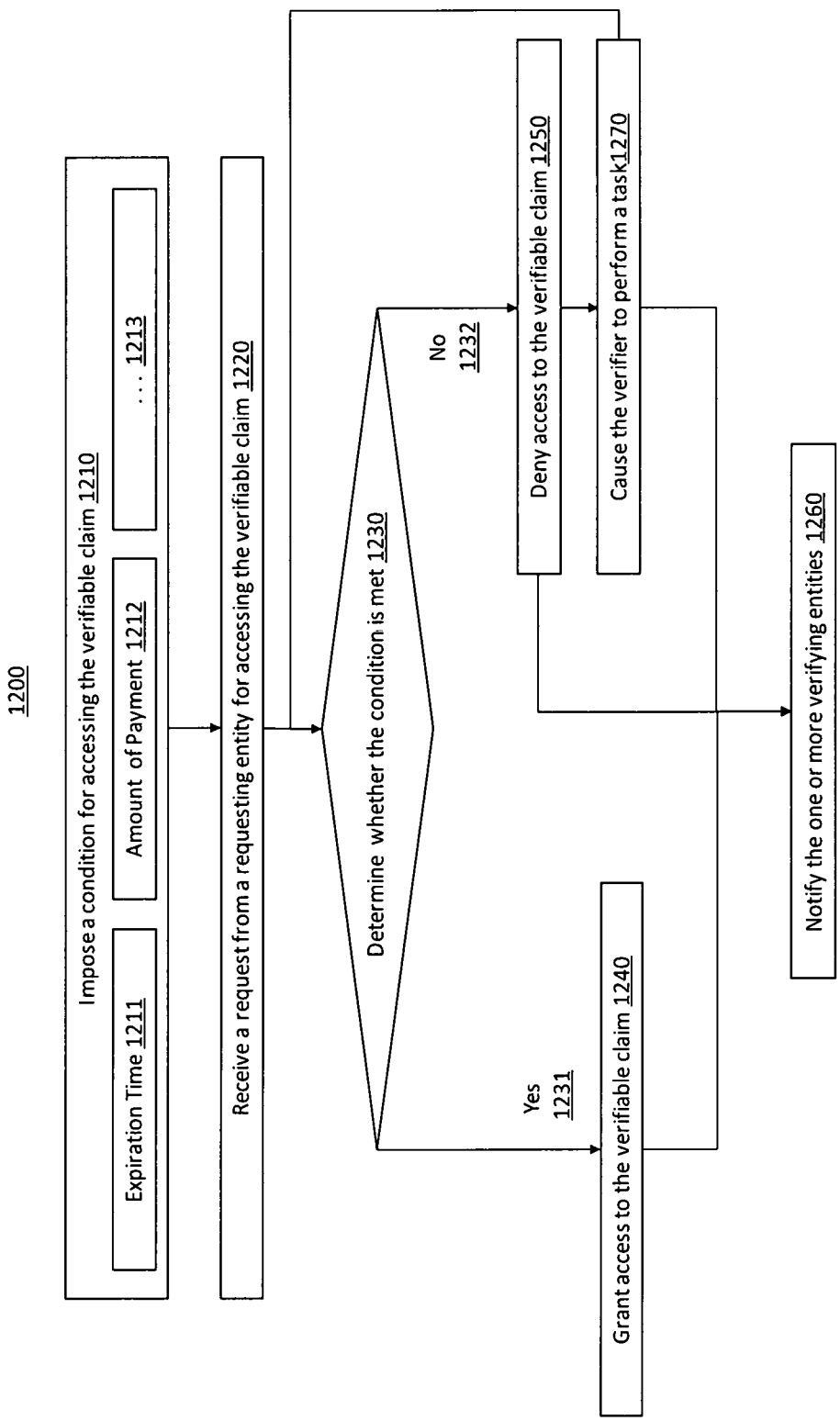
FIG. 12 illustrates a flowchart of an example method for imposing a condition for accessing a verifiable pairwise claim.

FIG. 12 illustrates a flowchart of an example method 1200 for imposing a condition for accessing the verifiable pairwise claim. The method 1200 also be implemented at a claim issuer. The method 1200 includes imposing a condition for accessing the verifiable pairwise claim 1210). The condition includes (but not limited to) an expiration time (1211). The digital asset includes verifiable digital asset. The verifiable digital asset is broadly defined as an object that has a value and/or can only be consumed for a limited number of times. The digital asset is made by any entities, or be required to be made by one or more particular entities, such as the subject entity and/or the one or more verifying entities. Further, the amount of digital asset is made via anonymous digital asset, including but are not limited to cryptocurrency controlled via a distributed ledger. In some cases, the digital asset is any verifiable digital asset.

The ellipsis 1213 represents that there is any number of conditions to be imposed. For example, verifying the identity of the requesting entity's identity also be a condition.

When the verifiable claim is accessed, the claim issuer receives a request from the requesting entity that the verifiable claim is accessed (1220). In response to the request, the claim issuer determines whether the condition is met (1230). For example, the claim issuer determines whether the claim has been expired, and/or require the verifier or the subject of the claim to pay a fee each time the claim is accessed.

When the condition is met, i.e., the determination is yes (1231), the claim issuer grants the verifier access to the verifiable claim 1240). When the condition is not met, i.e., the determination is no (1232), the claim issuer denies the verifier's access to the verifiable claim 1250). No matter the access to the verifiable claim is granted or denied, the subject entity receives a notification of the result (1260). Further, when the access to the verifiable claim is denied (1250), the one or more verifying entities (i.e., the verifier) is caused to perform certain tasks to cause the condition to be satisfied (1270). For example, when the verifiable claim has been expired, the one or more verifying entities are allowed to pay a fee to have the claim issuer to reissue the verifiable claim with a new expiration date.

The principles described herein allow the verifiable claims to be issued specifically between a subject entity and one or more particular verifying entities. Each of the subject entity and the one or more verifying entities is associated with an identifier, which is a DID or a centralized identifier. In some embodiments, at least some of the subject and/or verifying entities is associated with a device identifier, i.e., not directly associated with an identifier of a person, such that the identifiers associated with the subject and/or verifying entities not be deemed to be personally identifiable information. When two entities are communicating with each other, they can exchange each other's DIDs and at the same time exchange one or more verifiable pairwise claims. The personally identifiable information is included in the verifiable pairwise claims. Since these verifiable claims are pairwise, only the two entities involved would know the content of the respective verifiable claims. Thus, the privacy of users is further protected.

Further, when the principles described herein are implemented in a decentralized environment, such as using a distributed ledger or blockchain, the DIDs associated with the devices (which are not deemed as personally identifiable information) is propagated onto the distributed ledger under various privacy laws; and the personally identifiable information would only be presented in the encrypted verifiable pairwise claims, which can only be viewed by the subject entity and the respective verifying entities.

For the processes and methods disclosed herein, the operations performed in the processes and methods is implemented in differing order. Furthermore, the outlined operations are only provided as examples, an some of the operations is optional, combined into fewer steps and operations, supplemented with further operations, or expanded into additional operations without detracting from the essence of the disclosed embodiments.

The present invention is embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope

What is claimed is:

1. A computing system for issuing and managing verifiable claims, comprising:
one or more processors; and
one or more computer-readable media having thereon computer-executable instructions that are executable by the one or more processors to cause the computing system to:
receive a first request for issuing a first pairwise verifiable claim that is associated with a subject entity and that is verifiable by a first verifying entity, the first request including at least an encrypted portion using a particular type of cryptography;
based on receiving the first request:
verify that the subject entity is a subject of the first pairwise verifiable claim based on decrypting the encrypted portion using the particular type of cryptography; and
in response to verifying that the subject entity is the subject of the first pairwise verifiable claim, issue the first pairwise verifiable claim to the first verifying entity, including encrypting the first pairwise verifiable claim using a first cryptographic public key uniquely associated with the first verifying entity, allowing decryption solely by a first private key of the first verifying entity;
receive a second request for issuing a second pairwise verifiable claim associated with the subject entity, and that is verifiable by a second verifying entity, the second request including at least an encrypted portion using a particular type of cryptography; and
based on receiving the second request:
verify the subject entity as the subject of the second pairwise verifiable claim based on decrypting the encrypted portion using the particular type of cryptography; and in response to verifying that the subject entity is the subject of the second pairwise verifiable claim, issue the second pairwise verifiable claim to the second verifying entity, including encrypting the second pairwise verifiable claim using a second cryptographic public key uniquely associated with the second verifying entity, allowing decryption solely by a second private key of the second verifying entity, wherein the first pairwise verifiable claim and the second pairwise verifiable claim are issued to their respective verifying entities using a same decentralized identifier (DID) of the subject entity.

2. The computing system of claim 1, wherein the computer-executable instructions are also executable by the one or more processors to cause the computing system to:
impose a condition for accessing a verifiable claim; and
when a requesting entity requests for accessing the verifiable claim, determine whether the condition is met.

3. The computing system of claim 2, wherein the computer-executable instructions are also executable by the one or more processors to cause the computing system to:
in response to a determination that the condition is met, send the verifiable claim to the subject entity; and
cause the subject entity to pass on the verifiable claim to the requesting entity.

4. The computing system of claim 2, wherein the computer-executable instructions are also executable by the one or more processors to cause the computing system to:
in response to a determination that the condition is met, send the verifiable claim to the requesting entity directly.

5. The computing system of claim 2, wherein:
the condition includes verifying that an identity of the requesting entity is one of one or more predetermined verifying entities.

6. The computing system of claim 5, wherein:
at least one verifying entity is associated with a decentralized identifier (DID), and
verifying the identity of the requesting entity includes verifying that the requesting entity is a holder of the DID.

7. The computing system of claim 2, wherein the condition comprises receiving an amount of anonymous digital asset.

8. The computing system of claim 2, wherein the condition comprises a predetermined number of times that the verifiable claim is allowed to be accessed and/or an expiration time for allowing the verifiable claim to be accessed.

9. The computing system of claim 2, wherein the computer-executable instructions are also executable by the one or more processors to cause the computing system to encrypt the verifiable claim by one or more keys to create an encrypted verifiable claim.

10. The computing system of claim 9, wherein the one or more keys includes a public key of a verifying entity, so that the encrypted verifiable claim can only be decrypted by a private key of the verifying sentity.

11. The computing system of claim 9, wherein the computer-executable instructions are also executable by the one or more processors to cause the computing system to:
the encrypted verifiable claim to the subject entity; and
cause the subject entity to pass on the verifiable claim to a verifying entity.

12. The computing system of claim 9, wherein the computer-executable instructions are also executable by the one or more processors to cause the computing system to:

receive a request for accessing the encrypted verifiable claim from a requesting entity;
determine whether the condition is met; and
in response to a determination that the condition is met, cause the requesting entity to receive the one or more keys.

13. The computing system of claim 1, wherein the computer-executable instructions are also executable by the one or more processors to cause the computing system to:
impose a second condition for issuing the verifiable claim; and
when a request for issuing the verifiable claim is received, determine whether the second condition is met.

14. In a computing system that includes one or more processors, a method comprising:
receiving a first request for issuing a first pairwise verifiable claim that is associated with a subject entity and that is verifiable by a first verifying sentity, the first request including at least an encrypted portion using a particular type of cryptography;
based on receiving the first request:
verifying that the subject entity is a subject of the first pairwise verifiable claim based on decrypting the encrypted portion using the particular type of cryptography; and
in response to verifying that the subject entity is the subject of the first pairwise verifiable claim, issuing the first pairwise verifiable claim to the first verifying entity, including encrypting the first pairwise verifiable claim using a first cryptographic public key uniquely associated with the first verifying entity, allowing decryption solely by a first private key of the first verifying entity;
receive a second request for issuing a second pairwise verifiable claim associated with the subject entity, and that is verifiable by a second verifying entity, the second request including at least an encrypted portion using a particular type of cryptography; and
based on receiving the second request:
verify the subject entity as the subject of the second pairwise verifiable claim based on decrypting the encrypted portion using the particular type of cryptography; and
in response to verifying that the subject entity is the subject of the second pairwise verifiable claim, issue the second pairwise verifiable claim to the second verifying entity, including encrypting the second pairwise verifiable claim using a second cryptographic public key uniquely associated with the second verifying entity, allowing decryption solely by a second private key of the second verifying entity,
wherein the first pairwise verifiable claim and the second pairwise verifiable claim are issued to their respective verifying entities using a same decentralized identifier (DID) of the subject entity.

15. The method of claim 14, further comprising:
imposing a condition for accessing a verifiable claim; and
when a requesting entity requests for accessing the verifiable claim, determining whether the condition is met.

16. The method of claim 15, further comprising:
in response to a determination that the condition is met, sending the verifiable claim to the subject entity; and
causing the subject entity to pass on the verifiable claim to the requesting entity.

17. The method of claim 15, further comprising:
in response to a determination that the condition is met, sending the verifiable claim to the requesting entity directly.

18. The method of claim 15, wherein:
the condition includes verifying that an identity of the requesting entity is one of one or more predetermined verifying entities.

19. The method of claim 18, wherein:
at least one verifying entity is associated with a decentralized identifier (DID), and
verifying the identity of the requesting entity includes verifying that the requesting entity is a holder of the DID.

20. A computer-readable physical storage medium having stored thereon computer-executable instructions that are structured such that, when executed by one or more processors, the computer-executable instructions cause a computing system to at least:
receive a first request for issuing a first pairwise verifiable claim that is associated with a subject entity and that is verifiable by a first verifying entity, the first request including at least an encrypted portion using a particular type of cryptography;
based on receiving the first request:
verify that the subject entity is a subject of the first pairwise verifiable claim based on decrypting the encrypted portion using the particular type of cryptography; and
in response to verifying that the subject entity is the subject of the first pairwise verifiable claim, issue the first pairwise verifiable claim to the first verifying entity, including encrypting the first pairwise verifiable claim using a first cryptographic public key uniquely associated with the first verifying entity, allowing decryption solely by a first private key of the first verifying entity;
receive a second request for issuing a second pairwise verifiable claim associated with the subject entity, and that is verifiable by a second verifying entity, the second request including at least an encrypted portion using a particular type of cryptography; and
based on receiving the second request:
verify the subject entity as the subject of the second pairwise verifiable claim based on decrypting the encrypted portion using the particular type of cryptography; and
in response to verifying that the subject entity is the subject of the second pairwise verifiable claim, issue the second pairwise verifiable claim to the second verifying entity, including encrypting the second pairwise verifiable claim using a second cryptographic public key uniquely associated with the second verifying entity, allowing decryption solely by a second private key of the second verifying entity,
wherein the first pairwise verifiable claim and the second pairwise verifiable claim are issued to their respective verifying entities using a same decentralized identifier (DID) of the subject entity.

* * * * *